US011089435B2

(12) United States Patent
Suzuki

(10) Patent No.: US 11,089,435 B2
(45) Date of Patent: Aug. 10, 2021

(54) SYSTEM AND CONTROL METHOD THEREFOR

(71) Applicant: CANON KABUSHIKI KAISHA, Tokyo (JP)

(72) Inventor: Hiroshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/883,045

(22) Filed: May 26, 2020

(65) Prior Publication Data

US 2020/0382900 A1 Dec. 3, 2020

(30) Foreign Application Priority Data

May 31, 2019 (JP) .............................. JP2019-103177

(51) Int. Cl.
*H04W 4/02* (2018.01)
*H04W 4/029* (2018.01)
*H04W 4/80* (2018.01)

(52) U.S. Cl.
CPC ........... *H04W 4/023* (2013.01); *H04W 4/029* (2018.02); *H04W 4/80* (2018.02)

(58) Field of Classification Search
CPC ......... H04W 4/80; H04W 4/02; H04W 4/023; H04W 4/029; H04W 8/005; H04W 12/00503; H04W 4/33; H04W 4/50; H04W 76/14
See application file for complete search history.

(56) References Cited

U.S. PATENT DOCUMENTS

| 7,716,585 | B2 * | 5/2010 | Glass | ................ H04M 1/72427 |
| | | | | 715/734 |
| 8,611,819 | B2 * | 12/2013 | Lee | ........................ H04W 68/02 |
| | | | | 455/41.2 |
| 9,525,971 | B1 * | 12/2016 | Vega | ........................ G01S 19/42 |
| 10,134,261 | B1 * | 11/2018 | Nolan | ..................... G08B 21/24 |
| 2003/0045998 | A1 * | 3/2003 | Medl | ..................... G01S 5/0252 |
| | | | | 701/500 |

(Continued)

FOREIGN PATENT DOCUMENTS

JP 2017-037427 A 2/2017

*Primary Examiner* — Dung Hong
(74) *Attorney, Agent, or Firm* — Venable LLP

(57) ABSTRACT

A system includes a plurality of units each having a short-range wireless communication function capable of measuring position information relative to each other. A specification part specifies a positional relationship between the plurality of units, using information obtained by using the short-range wireless communication functions, a determination part uses the information obtained by using the short-range wireless communication functions to determine orientation information indicating orientation of a predetermined unit included in the plurality of units, and a generation part generates a layout chart of the plurality of units, based on the positional relationship between the plurality of units specified by the specification part and based on the orientation information. A display displays the layout chart, wherein information for enabling identification of a side of the predetermined unit that is to be operated by a user is indicated for an item of the predetermined unit included in the layout chart.

18 Claims, 17 Drawing Sheets

(56) References Cited

U.S. PATENT DOCUMENTS

| | | | |
|---|---|---|---|
| 2004/0203931 A1* | 10/2004 | Karaoguz | H04L 29/06 455/457 |
| 2007/0072582 A1* | 3/2007 | Nurmi | H04W 76/10 455/404.2 |
| 2011/0037712 A1* | 2/2011 | Kim | H04M 1/72457 345/173 |
| 2012/0100868 A1* | 4/2012 | Kim | H04W 4/023 455/456.1 |
| 2013/0237204 A1* | 9/2013 | Buck | G01S 19/34 455/418 |
| 2014/0098249 A1* | 4/2014 | Park | H04N 1/00251 348/207.2 |
| 2016/0023675 A1* | 1/2016 | Hannah | G05D 1/0011 701/2 |
| 2016/0328187 A1* | 11/2016 | Nathani | G06F 3/1205 |
| 2017/0038923 A1 | 2/2017 | Tsuzuki | |
| 2017/0303071 A1* | 10/2017 | Haverinen | G01S 3/46 |

* cited by examiner

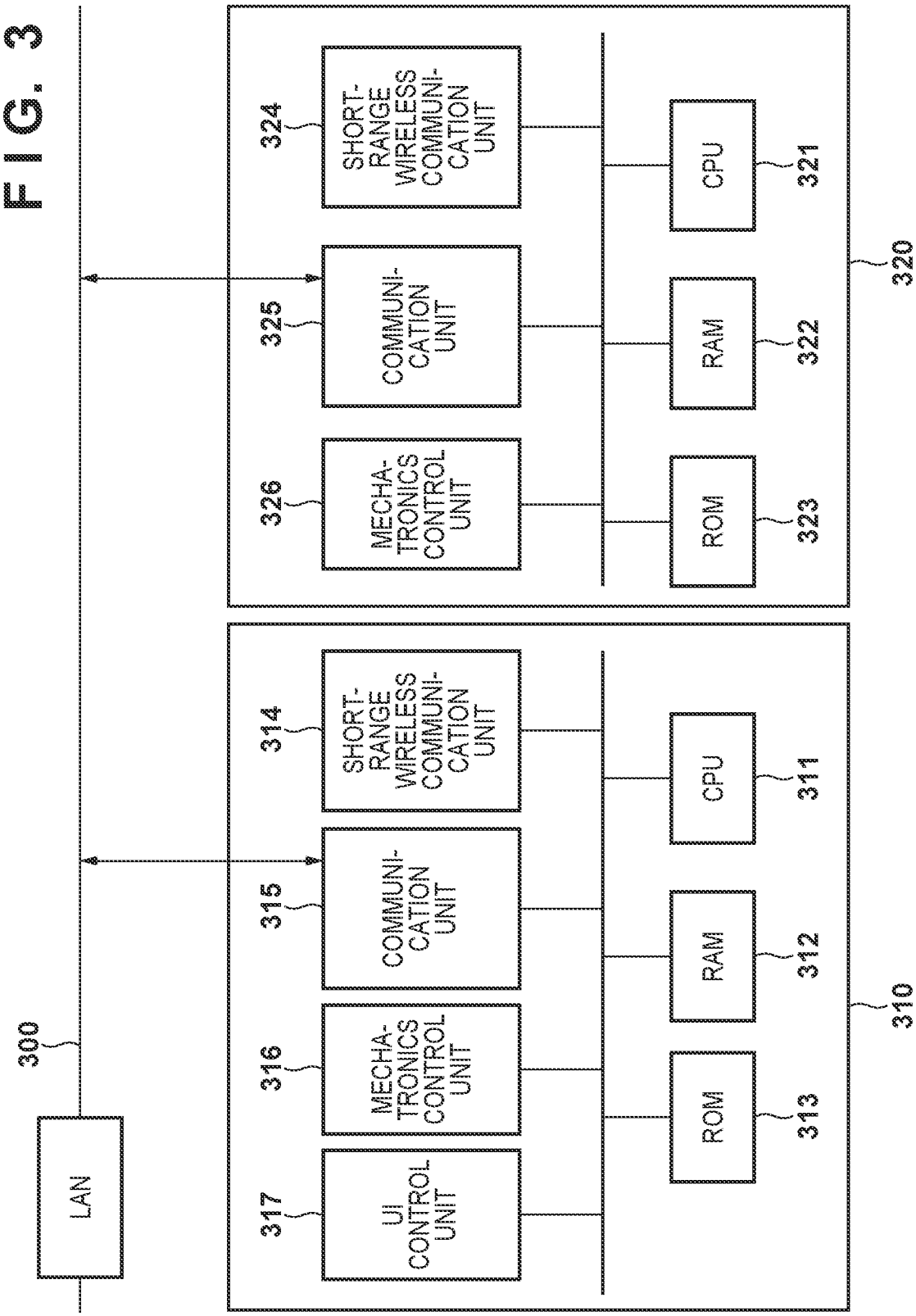

FIG. 5

SUBUNIT COORDINATES TABLE 500

| | 1 | 2 | 3 | 4 | 5 | 6 | 7 |
|---|---|---|---|---|---|---|---|
| SUBUNIT NUMBER | | | | | | | |
| SUBUNIT NAME | DFE | FIRST POWER UNIT | SECOND POWER UNIT | CONSUMABLE LIQUID UNIT | INK TANK UNIT | FIRST WASTE LIQUID TANK | SECOND WASTE LIQUID TANK |
| DISTANCE | | | | | | | |
| DIRECTION | | | | | | | |
| ORIENTATION | | | | | | | |

501 — SUBUNIT NUMBER
502 — SUBUNIT NAME
503 — DISTANCE
504 — DIRECTION
505 — ORIENTATION

F I G. 10A
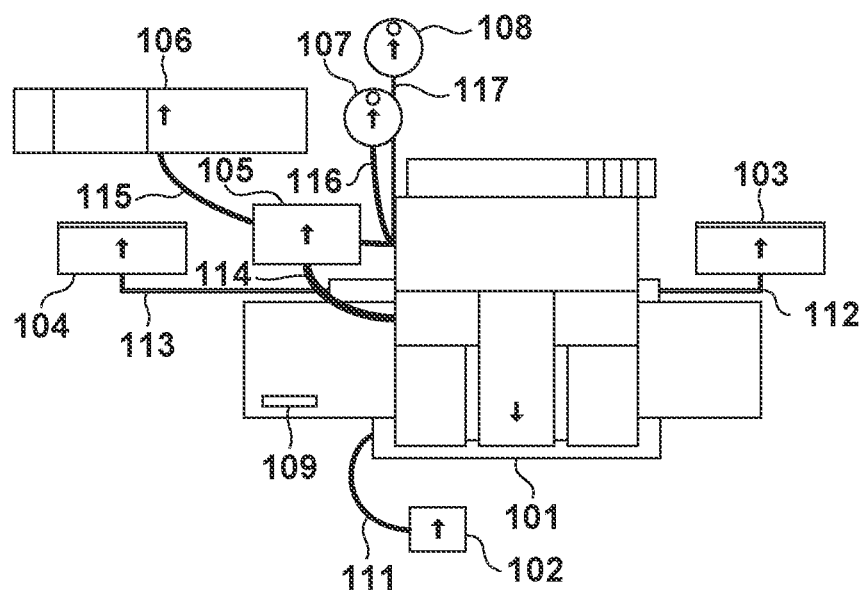
F I G. 10B
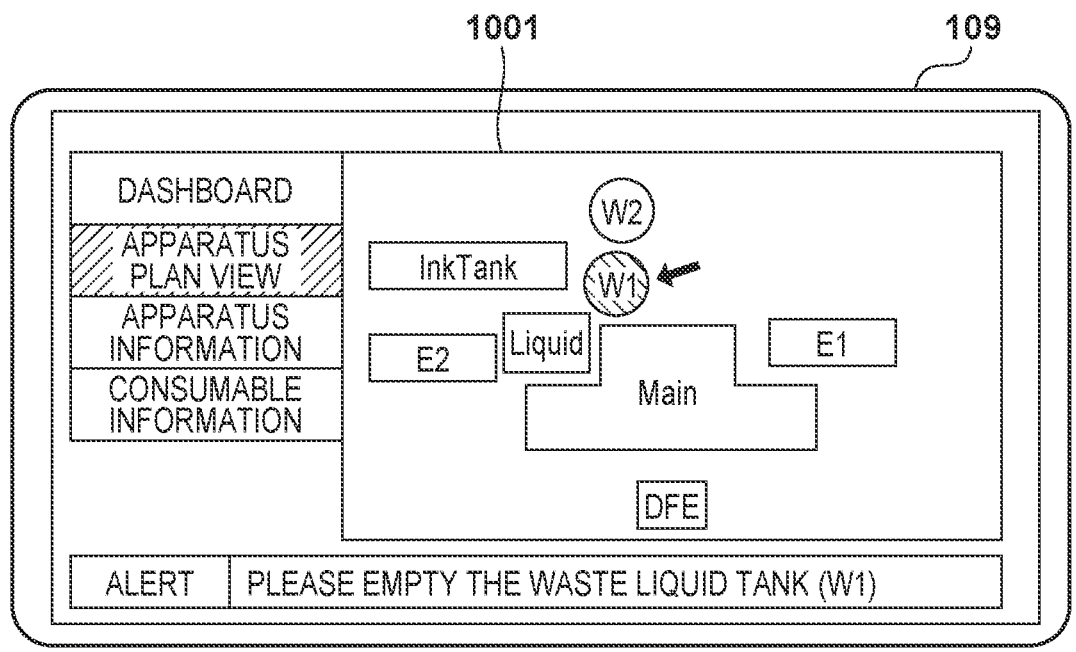

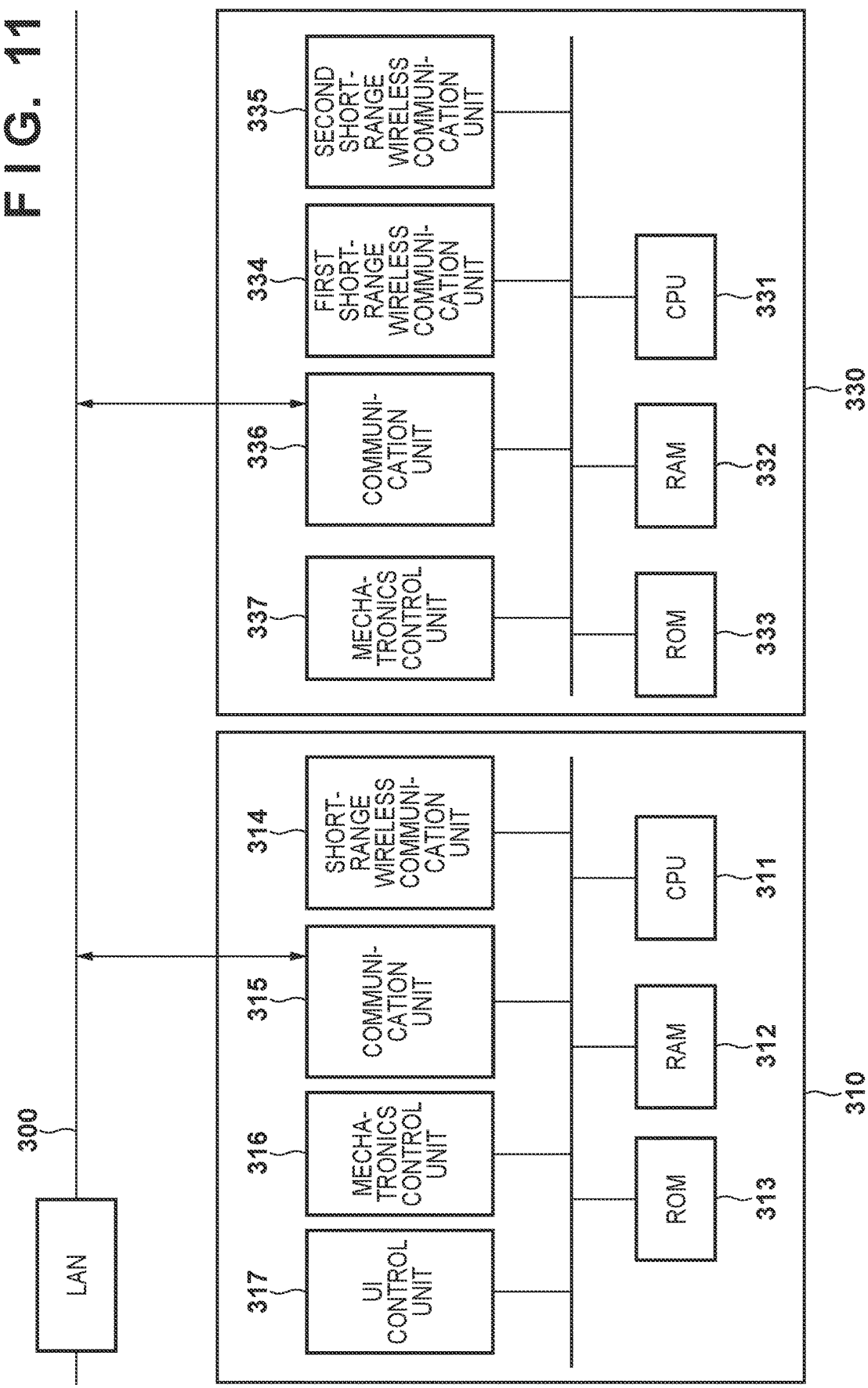

SYSTEM AND CONTROL METHOD THEREFOR

BACKGROUND OF THE INVENTION

Field of the Invention

The present invention relates to a system and control method therefor.

Description of the Related Art

Conventionally, using short-range wireless communication to transmit and receive data between apparatuses is known. For example, in Japanese Patent Laid-Open No. 2017-037427, there is a technology for specifying the distance between devices, using Bluetooth (registered trademark) communication.

In recent years, there have been calls for more accurate position detection technologies that use short-range wireless communication. Bluetooth 5.1 enables direction detection utilizing AoA (Angle of Arrival) or AoD (Angle of Departure). The relative positional relationship with a given device is thereby known, enabling the relative position from two Bluetooth devices that are close by to be specified with an error of few centimeters, for example.

SUMMARY OF THE INVENTION

According to one aspect of the present invention, there is provided a system constituted by a plurality of units each including a short-range wireless communication function capable of measuring position information relative to each other, one or more processors; and one or more memories that store a computer-readable instruction for causing, when executed by the one or more processors, the system to function as: a specification part that specifies a positional relationship between the plurality of units, using the position information measured by the short-range wireless communication functions; and a generation part that generates a layout chart of the plurality of units, based on the positional relationship between the plurality of units specified by the specification part.

Further features of the present invention will become apparent from the following description of exemplary embodiments (with reference to the attached drawings).

BRIEF DESCRIPTION OF THE DRAWINGS

FIG. 3 is a diagram showing an example configuration of control units of the printing apparatus according to a first embodiment.

FIG. 5 is a diagram showing an example configuration of a subunit coordinates table according to the embodiments.

FIGS. 10A to 10D are diagrams showing examples of an arrangement plan and a layout chart of the printing apparatus according to the first embodiment.

FIG. 11 is a configuration diagram of control units of the printing apparatus according to a second embodiment.

DESCRIPTION OF THE EMBODIMENTS

Figure 1:
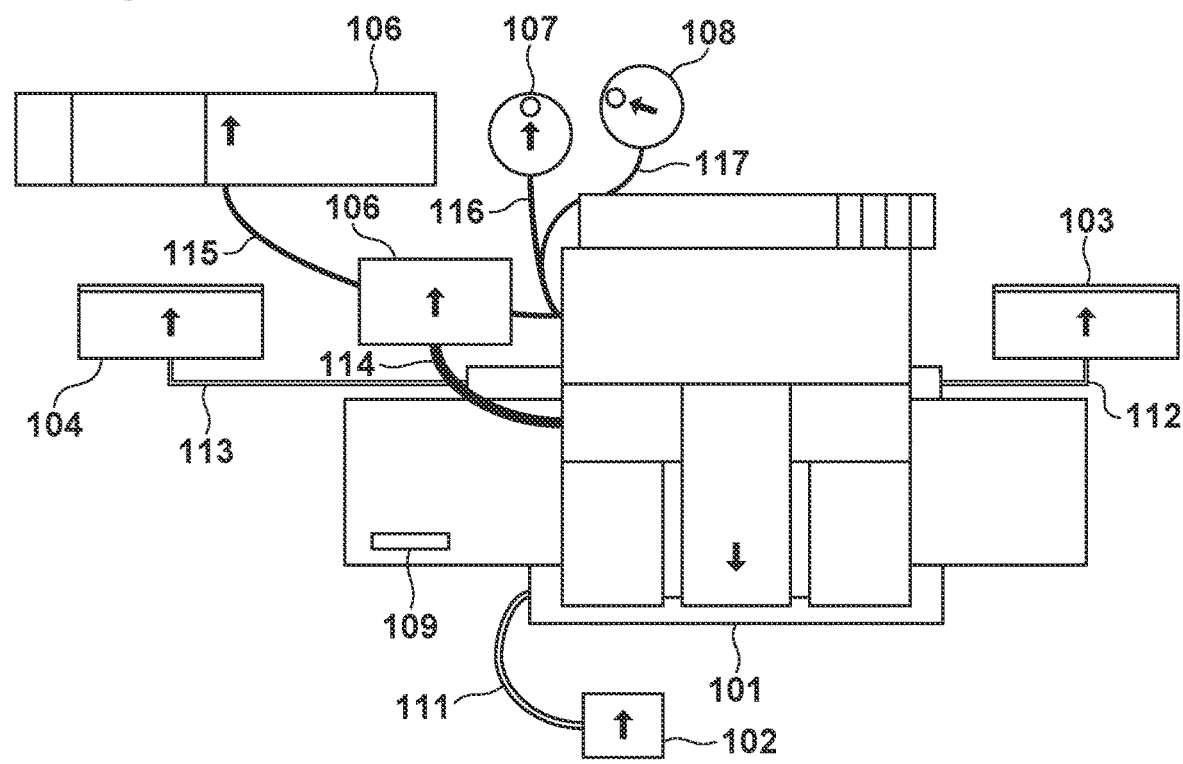
FIG. 1 is a plan view showing an example arrangement of units of a printing apparatus according to the embodiments.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

As a first embodiment, a mode in which the claimed invention is applied to layout chart generation of a large inkjet printing apparatus will be described.

Figure 2:
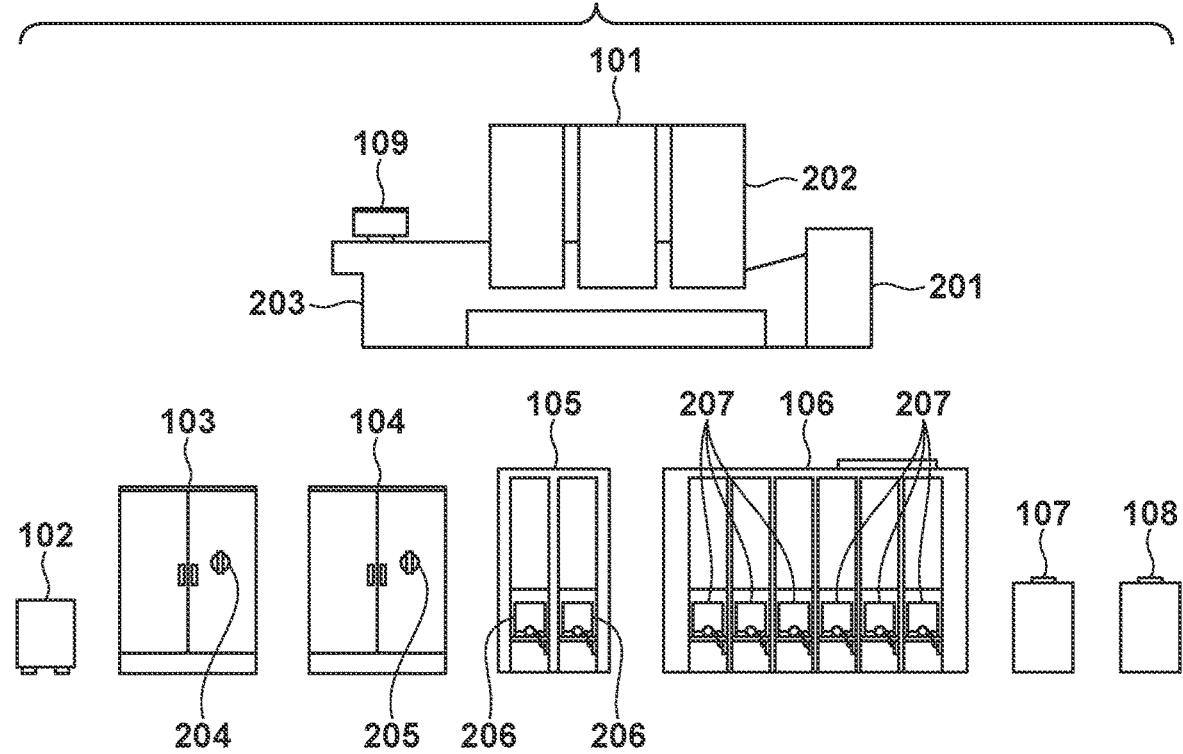
FIG. 2 is a front view of the units of the printing apparatus according to the embodiments.

The overall configuration of a printing apparatus according to the present embodiment will be described with reference to FIGS. 1 and 2. FIG. 1 is a plan view showing an example arrangement of units of a printing apparatus that is constituted by a plurality of units. FIG. 2 is a front view of the units of the printing apparatus shown in FIG. 1. Note that, the frontal direction of each unit is, in FIG. 1, indicated with an arrow sign. The "front" here will be described as indicating the side on which the user performs operations on the units.

A main unit 101 is a main unit that performs a printing operation in the printing apparatus. The main unit 101 is provided with a sheet feed part 201 that performs an operation for feeding print sheets, a printing part 202 that performs ink ejection from an inkjet head (not shown) and image formation on the sheets, and a sheet discharge part 203 that discharges the sheets. Furthermore, the main unit 101 is provided with a touch panel display 109 which is a display part. The touch panel display 109 displays screens which will be described later, and functions as a user interface capable of receiving various operations from the user. Also, the main unit 101 is internally provided with the electrical electronic board (not shown) for controlling the units. Note that the main unit may also be simply referred to as a communication apparatus.

A DFE (digital front end) 102 is a server computer of print jobs and image data, and is for managing print jobs to be executed by the printing apparatus. The DFE 102 is capable of being connected to an external network by a network cable (not shown), and receiving input of print jobs from the external network. Also, the DFE 102 is connected to the main unit 101 by a DFE cable 111. The DFE cable 111 is a communication line that performs transmission and reception of image data and commands.

A first power unit 103 is one of two power units that supply power to the printing apparatus, and is provided with a breaker switch 204 as shown in FIG. 2. Also, the first power unit 103 is connected to the main unit 101 by a first power unit cable 112. The first power unit cable 112 is a cable formed by bundling an electrical cable for sending mass current and a communication line for performing communication between units. A second power unit 104 is one of two power units that supply power to the printing apparatus, and is provided with a breaker switch 205 as shown in FIG. 2. Also, the second power unit 104 is connected to the main unit 101 by a second power unit cable 113. The second power unit cable 113 is a cable formed by bundling an electrical cable for sending mass current and a communication line for performing communication between units.

A consumable liquid unit 105 is a unit for installing a consumable liquid tank 206 that is used in an image forming process of the printing apparatus. Consumable liquids include a cleaning solution that is used for cleaning the inkjet head and a coating agent for improving image quality. The consumable liquid unit 105 is connected to the main unit 101 by a consumable liquid unit cable 114. The consumable liquid unit cable 114 is formed by bundling a supply tube that supplies consumable liquids to the printing part 202 and a communication line for performing communication between units. Furthermore, the consumable liquid unit 105 has a mechanism that sucks a consumable liquid from each of a plurality of installed consumable liquid tanks 206, and is capable of supplying consumable liquids to the main unit 101 through the supply tube of the consumable liquid unit cable 114.

An ink tank unit 106 is a unit for installing a plurality of ink tanks 207 holding ink of various colors to be ejected from the inkjet head. The ink tank unit 106 is connected to the main unit 101 by an ink tank unit cable 115. The ink tank unit cable 115 is a cable formed by bundling a supply tube that supplies ink of various colors to the printing part 202 and a communication line for performing communication between units. Furthermore, the ink tank unit 106 has a mechanism that sucks ink from each of the installed ink tanks 207 of various colors, and is capable of providing a consumable to the main unit 101 through the ink tank unit cable 115.

A first waste liquid tank 107 is a tank for temporarily storing used or excess consumable liquid or the like. The first waste liquid tank 107 is connected to the main unit 101 by a first waste liquid tank cable 116. The first waste liquid tank cable 116 is a cable formed by bundling a discharge tube for passing waste liquid that is discharged from the main unit 101 and a communication line for performing communication between units. A second waste liquid tank 108 is a tank for temporarily storing excess ink or the like. The second waste liquid tank 108 is connected to the main unit 101 by a second waste liquid tank cable 117. The second waste liquid tank cable 117 is a cable formed by bundling a discharge tube for passing waste liquid that is discharged from the main unit 101 and a communication line for performing communication between units.

The overall configuration of the printing apparatus according to the present embodiment has been described above. Although an external power cable that is connected to the first power unit 103 and the second power unit 104, a duct for releasing exhaust produced by the printing operation, and the like are provided as external configuration of the printing apparatus, description thereof is omitted here. Also, the above configuration is an example, and other units may be included.

As shown in FIG. 1, in the printing apparatus according to the present embodiment, a configuration is adopted in which a plurality of units are connected by a flexible cable. The installation layout of these units can be flexibly implemented to suit the environment in which the apparatus is installed. That is, the apparatus arrangement shown in the plan view of FIG. 1 is an example, and the installation position and orientation of the other units relative to the main unit 101 is changeable. Example arrangements other than the apparatus arrangement shown in FIG. 1 will be described later.

Next, typical tasks that an operator performs on the units of the printing apparatus will be described. Tasks performed on the main unit 101 include setting sheets in the sheet feed part 201 and removing printed matter from the sheet discharge part 203. Also, by operating the touch panel display 109, it is possible to check the state of each unit and perform operations for executing functions such as printing and automatic maintenance. Operations such as inputting print jobs are performed on the DFE 102. Operation of the breaker switches 204 and 205 is performed on the first power unit 103 and the second power unit 104 prior to operation of the apparatus. Replacement of consumable liquid tanks is performed on the consumable liquid unit 105. Replacement of the ink tanks 207 of various colors is performed on the ink tank unit 106. The task of discharging waste liquid inside the tanks and transferring the waste liquid to a drum can for disposal is performed on the first waste liquid tank 107 and the second waste liquid tank 108.

Next, control parts of the units of the printing apparatus described above will be described using FIG. 3. The main unit 101 has a control unit indicated by a main unit control unit 310 in FIG. 3. Also, the DFE 102, the first power unit 103, the second power unit 104, the consumable liquid unit 105, the ink tank unit 106, the first waste liquid tank 107 and the second waste liquid tank 108 each have a control unit indicated by a subunit control unit 320 in FIG. 3. That is, in the present embodiment, there are a plurality of subunit control units 320.

The main unit control unit 310 is constituted to include an UI control unit 317, a CPU 311, a RAM 312, a ROM 313, a communication unit 315, a short-range wireless communication unit 314, and a mechatronics control unit 316.

The UI control unit 317 is a module that administers reception of data input and operation instructions from the user and screen output to the user, and controls the touch panel display 109 in the present embodiment. The CPU 311 is a system control unit, and performs overall control of the main unit 101. The ROM 313 is a nonvolatile storage area, and stores fixed data of control programs, data tables, an embedded operating system (OS) program and the like that are executed by the CPU 311. In the present embodiment, the control programs that are stored in the ROM 313 control execution of software such as scheduling, task switching, interrupt processing, and the like under the control of the embedded OS that is stored in the ROM 313.

The RAM 312 is constituted by a SRAM (Static Random Access Memory) or the like requiring a backup power source. Note that since data is held by a primary battery for data backup that is not illustrated, the RAM 312 is able to store important data such as program control variables in a nonvolatile manner. Also, a memory area that stores setting information, management data and the like of the main unit control unit 310 is also provided in the RAM 312. The RAM 312 is also used as a main memory and a work memory of the CPU 311.

The communication unit 315 is a constituent element for connecting to a communication unit 325 of the subunit control unit 320 via an apparatus network 300, and executing data communication. Note that the apparatus network 300 is a LAN (Local Area Network), for example, and is configured to enable the communication unit 315 and the communication unit 325 to communicate with each other. The mechatronics control unit 316 performs mechatronics control of various motors, sensors, and the like.

The short-range wireless communication unit 314 is a constituent element for executing data communication by establishing a short-range wireless connection, and performs communication with a different communication method from the communication unit 315. The short-range wireless communication unit 314 can connect to a short-range wireless communication unit 324 within the subunit control unit 320. Note that, in the present embodiment, use of the Bluetooth 5.1 communication standard is assumed as the communication method of the short-range wireless communication unit 314. Note that while Bluetooth 5.1 includes both the Classic Bluetooth and Bluetooth Low Energy (BLE) standards, use of BLE is assumed in the present embodiment. In other words, the main unit is capable of executing short-range wireless communication using the short-range wireless communication unit 314. Note that, although the communicable range between short-range wireless communication units according to the present embodiment is not particularly limited, it is assumed that, among the plurality of units constituting the printing apparatus, at least the main unit and the subunits are arranged within communicable range. According to the BLE standard of Bluetooth 5.1, by providing and controlling a plurality of antennas, the communication unit on the scanner side (receiving side) is able to compute the distance and direction of the communication unit on the advertiser side (transmitting side). Note that the subunits serve as a communication partner apparatus of the main unit.

Here, the distance and direction computation procedures will be described. The following description is premised on the short-range wireless communication unit 324 functioning as the advertiser (or slave) that broadcasts (transmits) advertising information discussed below, and the short-range wireless communication unit 314 functioning as the scanner (or master) that receives the advertising information. Note that it is also possible for the short-range wireless communication units to interchange the roles of scanner and advertiser (mode switching).

Figure 15:
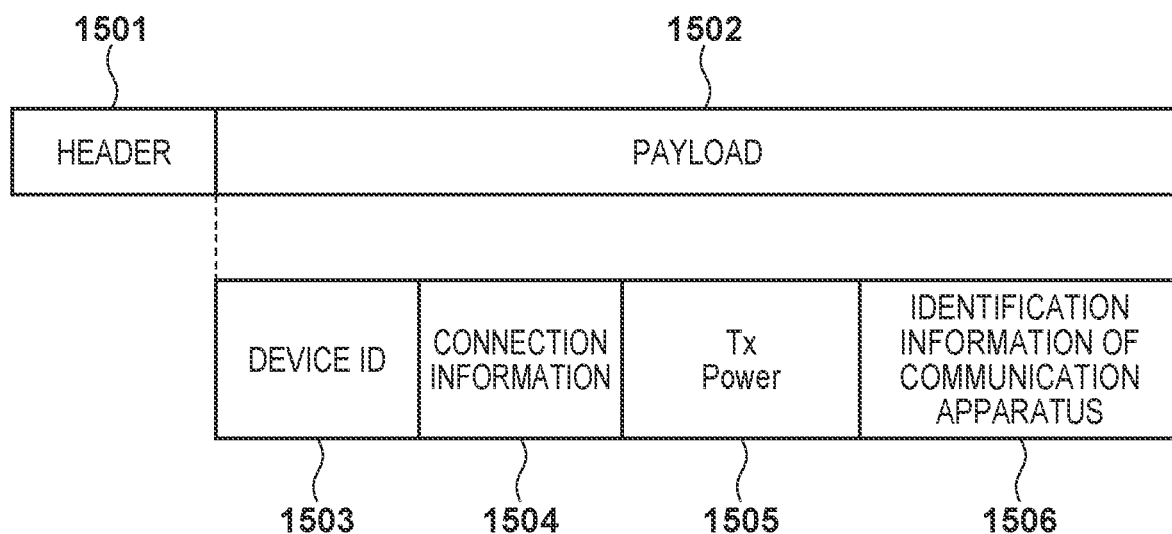
FIG. 15 is a diagram for illustrating a structure of advertising information.

FIG. 15 shows an example of the structure of advertising information that the short-range wireless communication unit 324 broadcasts to the surrounding area. The short-range wireless communication unit 324 performs initialization processing upon supply of power being started, and enters an advertising state. Upon entering the advertising state, the short-range wireless communication unit 324 periodically broadcasts advertising information to the surrounding area based on a predetermined advertising interval. Advertising information is a signal that includes basic header information (identification information for identifying the apparatus that transmits the advertising information, etc.), and is constituted by a header 1501 and a payload 1502.

The main unit 101 is able to recognize the presence of each subunit, by receiving advertising information from the subunit. Furthermore, the main unit 101 is able to establish a BLE connection with a subunit by transmitting a BLE connection request to the subunit. The header 1501 is a region that stores information on the type of advertising information and the size of the payload 1502, and the like. The payload 1502 stores information such as device ID 1503 serving as identification information, loading profile information, connection information 1504 for establishing a BLE connection with the subunit, and transmission power (Tx-Power) 1505 of the advertising information. Note that the advertising information may include identification information 1506 of the subunit. The MAC address of the subunit, service information of the subunit or the like corresponds to the identification information 1506 of the subunit.

In the present embodiment, it is assumed that the short-range wireless communication unit 324 enters the advertising state in the case where the power source of the subunit is ON, and starts transmission of advertising information. The timing at which the short-range wireless communication unit 324 starts transmission of advertising information is, however, not limited to an above-described mode, and may, for example, be the timing at which a predetermined operation for enabling the BLE function is performed. The advertising interval at which advertising information is broadcast is also not particularly limited.

Figure 16:
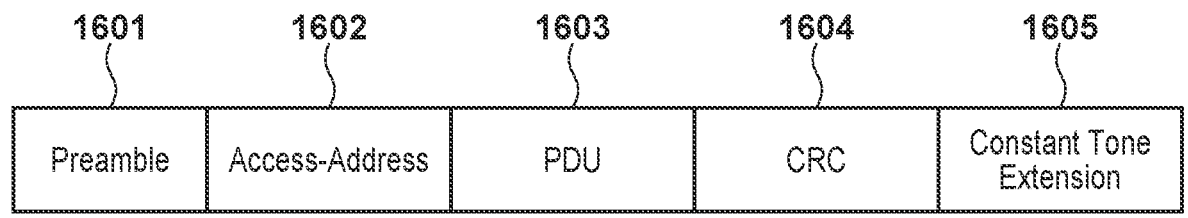
FIG. 16 is a diagram for illustrating a structure of advertising information.

FIG. 16 is an example of the structure of advertising information that is transmitted by the short-range wireless communication unit 324 within a subunit, in order to cause the main unit 101 to detect the distance to the subunit and the direction of the position of the subunit. Constant Tone Extension (CTE) 1605 is data that is used in order to detect the direction of the subunit relative to the main unit 101. Preamble 1601 is data for clock synchronization at the time of the main unit 101 receiving the advertising information of the subunit. Access-Address 1602 is data for frame synchronization at the time of the main unit 101 receiving the advertising information of the subunit. PDU 1603 is the real data portion in the advertising information that is transmitted by the subunit. Note that the header 1501 and the payload 1502 constituting the advertising information shown in FIG. 15 are included in PDU 1603. CRC 1604 is an error detection code value at the time of communicating PDU 1603.

Figure 17:
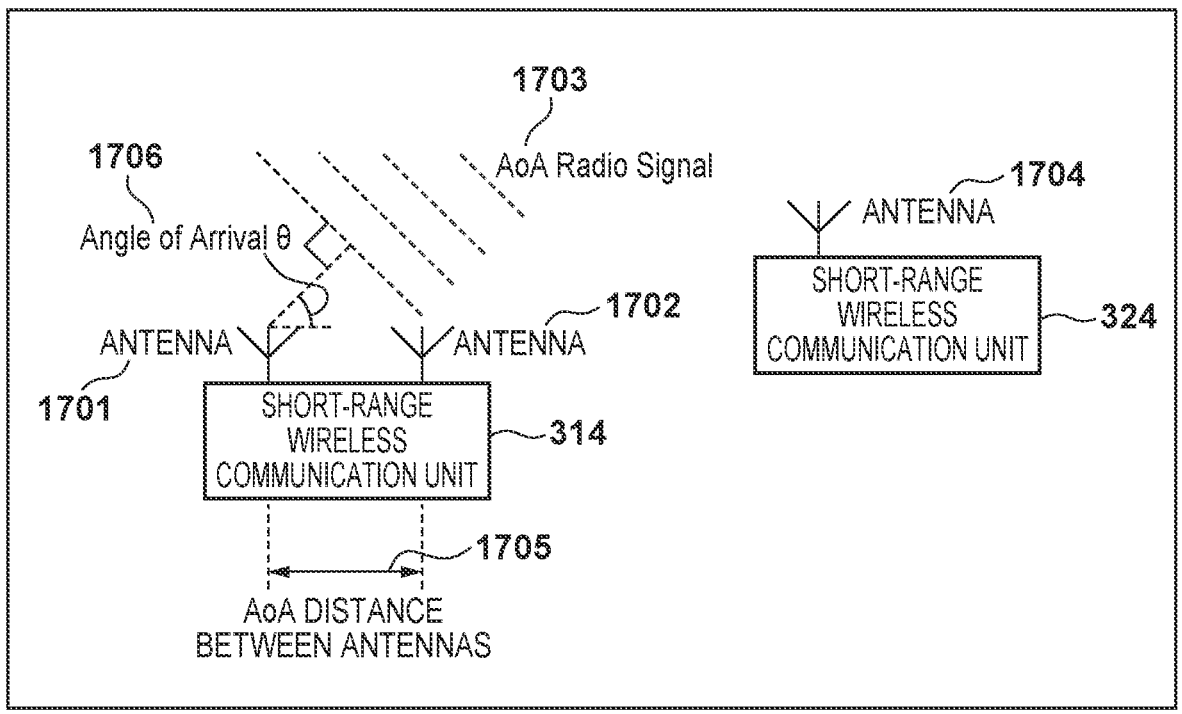
FIG. 17 is a diagram for illustrating direction detection by a configuration provided with a plurality of antennas on an advertisement receiving side.
Figure 18:
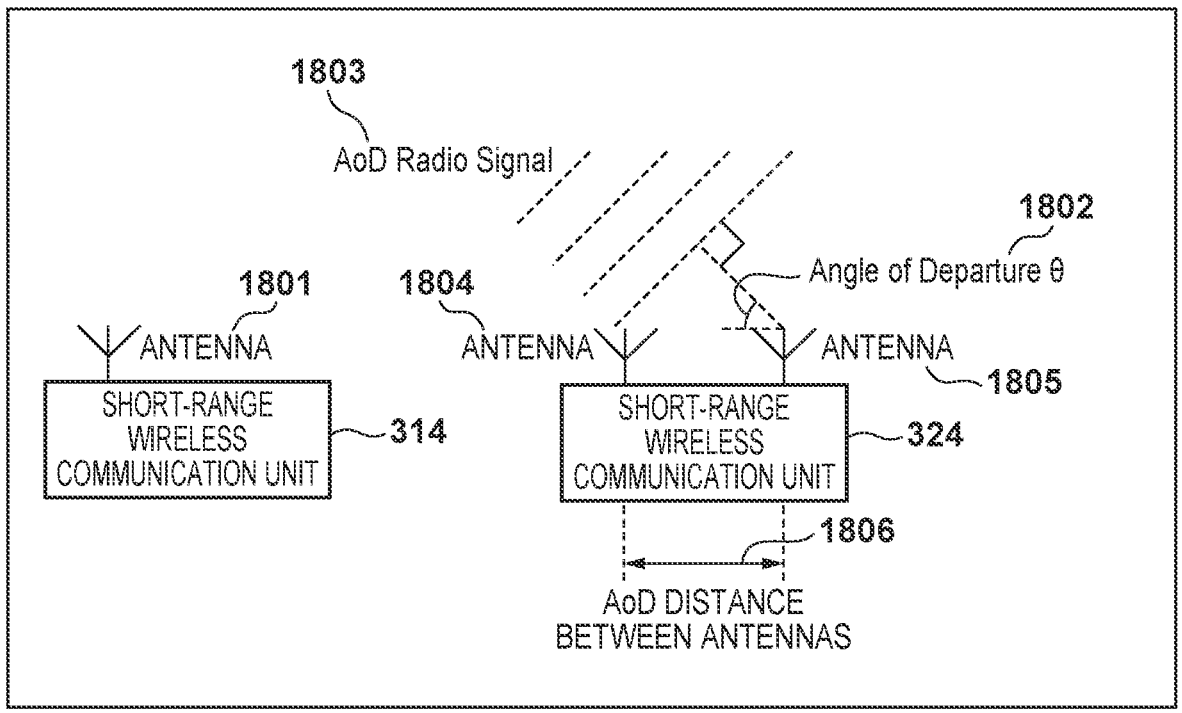
FIG. 18 is a diagram for illustrating direction detection by a configuration provided with a plurality of antennas on an advertisement transmitting side.

There are two methods by which the main unit 101 detects the direction of a subunit; namely, a method that is realized by the short-range wireless communication unit 314 being provided with a plurality of antennas, and a method that is realized by the short-range wireless communication unit 324 being provided with a plurality of antennas. Below, these methods will be described using FIGS. 17 and 18. Note that although FIGS. 17 and 18 illustrate examples in which two antennas are provided, the present invention is not limited thereto. For example, three or more antennas may be arranged in a plane rather than in a straight line, such that detection is possible over at least 360 degrees in two dimensions. Also, if the printing apparatus is a rectangular parallelepiped, for example, an antenna may be installed at each of the eight vertices.

First, the method by which the main unit 101 detects the direction of a subunit that is realized by the short-range wireless communication unit 314 being provided with a plurality of antennas will be described using FIG. 17. Here, an example will be described in which two antennas 1701 and 1702 are given as the plurality of antennas provided in the short-range wireless communication unit 314, but more antennas may be provided.

The short-range wireless communication unit 324 transmits an AoA radio signal 1703 which is advertising information that includes CTE 1605 from an antenna 1704. The short-range wireless communication unit 314 receives the AoA radio signal 1703 with the plurality of antennas (both antennas 1701 and 1702). Here, the phase difference and wavelength of the AoA radio signal 1703 received with the antenna 1701 and the antenna 1702 are respectively given as $\psi$ and $\lambda$. Also, the distance between the antenna 1701 and the antenna 1702 is given as an AoA distance between antennas d 1705. By using these values and equation (1), an angle of arrival $\theta$ 1706 which is the direction of the subunit from the main unit 101 is calculated by the main unit 101.

$$\theta = \arccos((\psi\lambda)/(2\pi d)) \quad (1)$$

In this way, the main unit 101, having received advertising information from a subunit, is able to detect the direction of the subunit by calculating the angle of arrival $\theta$ 1706. In other words, since the antenna 1701 and the antenna 1702 are installed in different positions, a phase difference $\psi$ arises when the signal therefrom is received with the antenna 1701 and the antenna 1702, even with the same AoA radio signal 1703. By deriving $\theta$ based on this phase difference $\psi$, it becomes possible for the main unit 101 (short-range wireless communication unit 314) to specify the direction of the subunit (short-range wireless communication unit 324) relative to the main unit 101.

Next, the method by which the main unit 101 detects the direction of the subunit that is realized by the short-range wireless communication unit 324 being provided with a plurality of antennas will be described using FIG. 18. Here, an example will be described in which two antennas 1804 and 1805 are given as the plurality of antennas provided in the short-range wireless communication unit 324, but more antennas may be provided.

The short-range wireless communication unit 324 transmits an AoD radio signal 1803 which is advertising information that includes CTE 1605 from the plurality of antennas (both antennas 1804 and 1805). The short-range wireless communication unit 314 receives the AoD radio signal 1803 with an antenna 1801. Here, the phase difference and wavelength of the AoD radio signal 1803 transmitted with the antenna 1804 and the antenna 1805 are respectively given as $\psi$ and $\lambda$. The distance between the antenna 1804 and the antenna 1805 is given as an AoD distance between antennas d 1806. By using these values and equation (2), an angle of departure $\theta$ 802, which is the direction of the subunit from the main unit 101, is calculated by the main unit 101.

$$\theta = \arccos((\psi\lambda)/(2\pi d)) \quad (2)$$

In this way, the main unit 101, having received advertising information from a subunit, is able to detect the direction of the subunit by calculating an angle of departure $\theta$ 1802. In other words, since the transmitting antenna 1804 and antenna 1805 are installed in different positions, a phase difference $\psi$ arises when the signals therefrom are received with the antenna 1801, even with the same AoD radio signal 1803. By deriving $\theta$ based on this phase difference $\psi$, it becomes possible for the main unit 101 (short-range wireless communication unit 314) to specify the direction of the subunit (short-range wireless communication unit 324) relative to the main unit 101.

Note that, although in the description of the method that is realized by the short-range wireless communication unit 314 being provided with a plurality of antennas described a mode in which two antennas 1701 and 1702 are used as the plurality of antennas, the number of antennas that are used is not limited thereto. For example, the main unit may use three or more antennas, and the angle of arrival $\theta$ 1702 may be obtained by computing the average of the angles of arrival $\theta$ that are derived from the respective antennas. Similarly, even with the method that is realized by the short-range wireless communication unit 324 being provided with a plurality of antennas, the number of antennas that are used as the plurality of antennas is not limited to the abovementioned number. For example, the subunit is provided with three or more antennas. The main unit may obtain angle of departure $\theta$ 1802 by computing the average of angles of departure $\theta$ that are derived using the advertising signals that are sent from the respective antennas of the subunit.

Also, the main unit 101 is able to detect the distance from the subunit, from the strength when the short-range wireless communication unit 314 receives the AoA radio signal 1703 with the antenna 1701 and the value of the transmission power 1505 that is included in the advertising information. Note that the correspondence relationship between the intensity at the time of reception and the value of transmission power may be defined beforehand with a table or the like, or may be determined with a predetermined equation.

Also, in the above, an embodiment in which one of the main unit 101 and the subunit uses a plurality of antennas was described, but the present invention is not limited thereto. These apparatuses may both use a plurality of antennas. The claimed invention is characterized by utilizing a function for computing the distance and direction of these apparatuses, a detailed description of which will be given later.

Description will now return to FIG. 3. The subunit control unit 320 is the control part of units other than the main unit 101. The subunit control unit 320 is constituted to include a ROM 323, a RAM 322, a CPU 321, a mechatronics control unit 326, the communication unit 325, and the short-range wireless communication unit 324. The configuration within the subunit control unit 320 is equivalent to the configuration of the main unit control unit 310 apart from not including an UI control unit. Note that, with respect to the subunit control unit 320, the common constituent elements of the control units of the respective units have been described, but there may be differences in control between the individual units and individual additional constituent elements. For example, the consumable liquid unit 105 and the ink tank unit 106 may differ in the type and number of sensors that are controlled by the mechatronics control unit 326. Also, for example, a mass storage device for storing image data may be connected to the DFE 102. A detailed description of the individual differences in control and individual additional constituent elements is unnecessary in describing the embodiments of the present invention, and will thus be omitted.

Next, the contents of the display screen of the touch panel display 109 that is mounted in the main unit 101 of the printing apparatus will be described using FIGS. 4A to 4D. FIGS. 4A to 4D show an example switching of a number of display contents of the display screen. The configuration of the display screen includes display switching buttons 401, a main display region 402, and an alert display region 403.

The display switching buttons 401 are a group of selection buttons for switching the mode of display in the main display region 402. Buttons that are selectable with the display switching buttons 401 are not limited to those described below, and a larger number of buttons may be provided according to the function. Also, the screen configuration (arrangement of the display region) of display on the touch panel display 109 is not limited to the following.

Figure 4A:
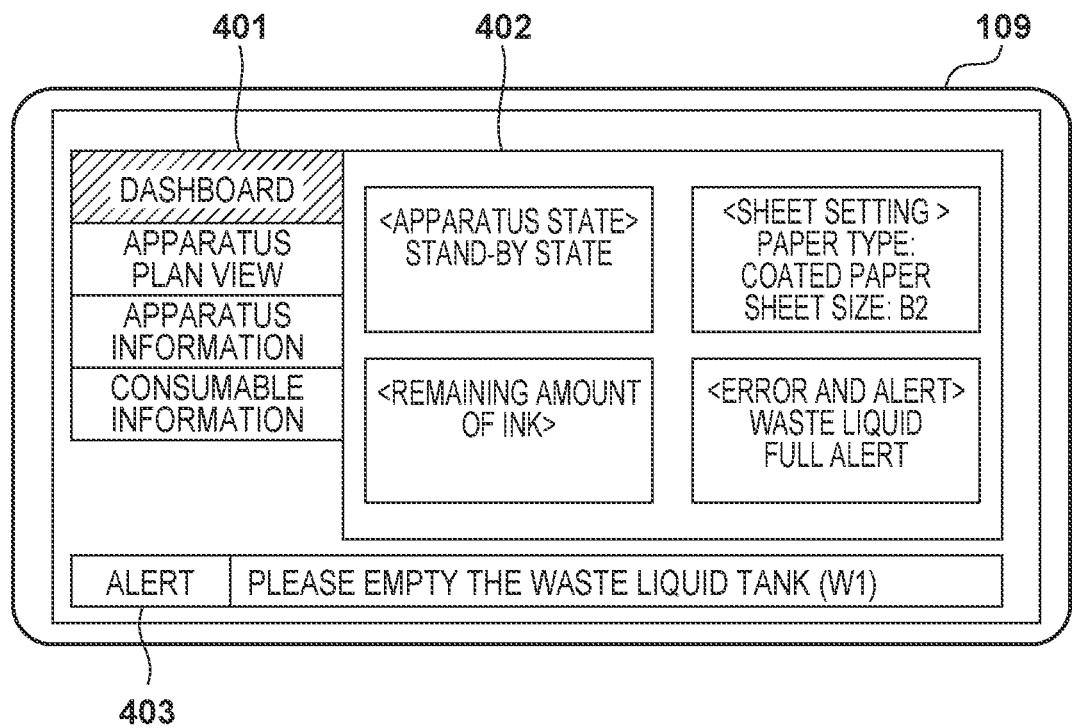
FIGS. 4A to 4D are diagrams showing example display on a touch panel display of the printing apparatus according to the embodiments.
Figure 4B:
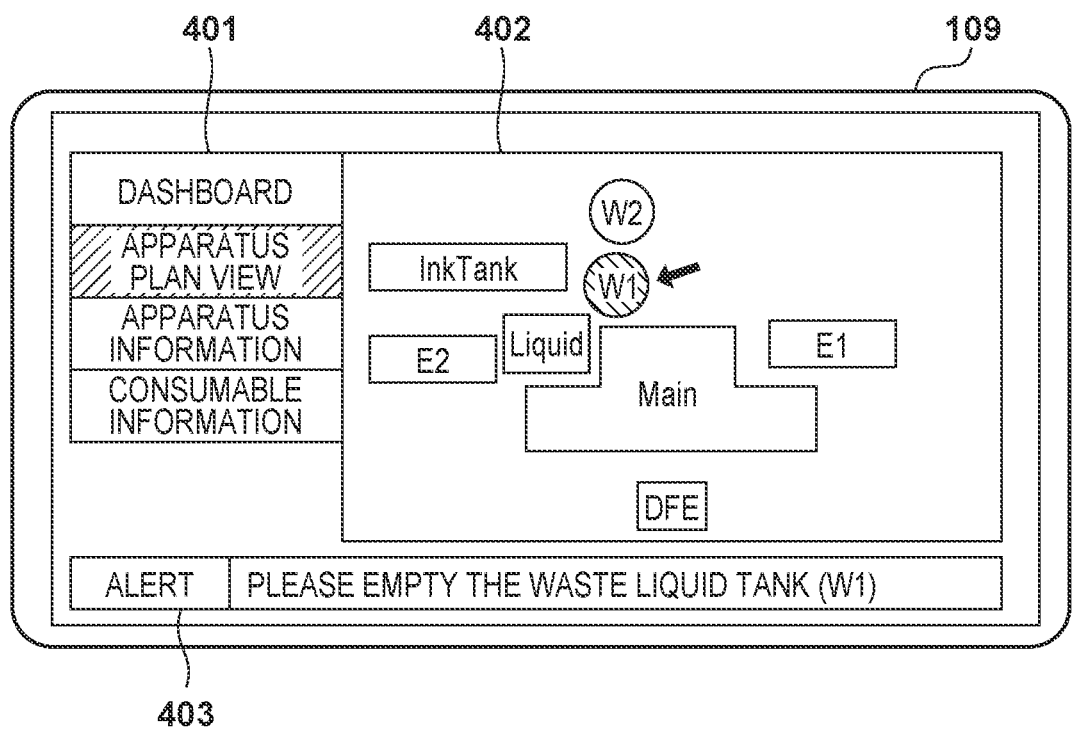
Figure 4C:
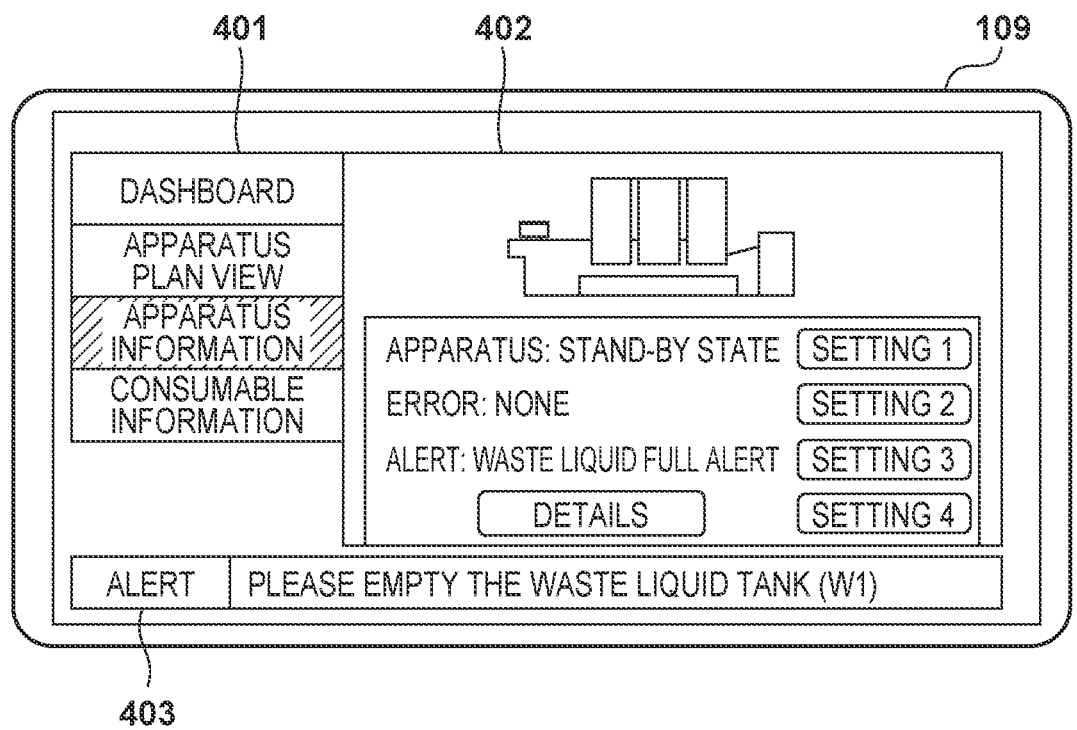
Figure 4D:
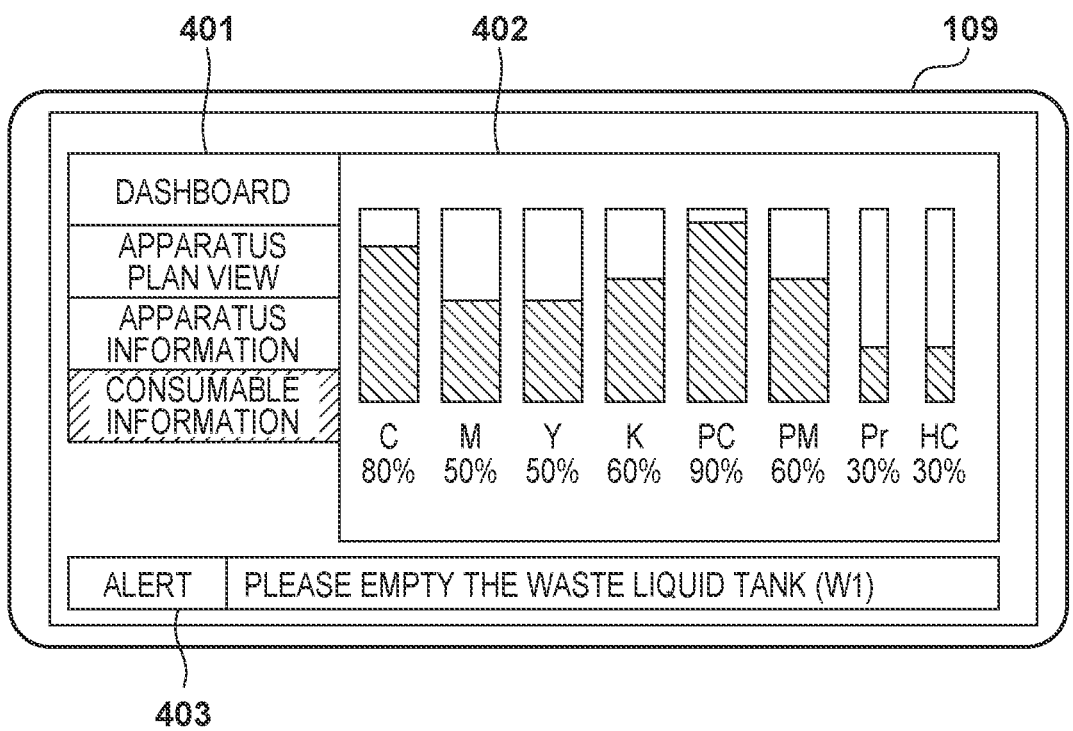

For example, when a "Dashboard" button of the display switching buttons 401 is selected by being pressed, the overall state of the printing apparatus is displayed in the main display region 402, as shown in FIG. 4A. When an "Apparatus Plan View" button of the display switching buttons 401 is selected by being pressed, a layout chart of the printing apparatus is displayed in the main display region 402, as shown in FIG. 4B. When an "Apparatus Information" button of the display switching buttons 401 is selected by being pressed, the managed state and setting values of the printing apparatus are displayed in the main display region 402, as shown in FIG. 4C. When a "Consumable Information" button of the display switching buttons 401 is selected by being pressed, the remaining amount of each ink tank and the remaining amount of the consumable liquid tank are displayed, as shown in FIG. 4D.

Also, the alert display region 403 is displayed on the screen, irrespective of the selection state of the display switching buttons 401, in order to convey important information referred to as apparatus alerts to the operator of the apparatus. Here, an example in which a waste liquid full alert that is notified in the case where the surface of the liquid in the first waste liquid tank 107 is near the upper limit is shown as an example of an apparatus alert. A message "Please empty the waste liquid tank (W1)" prompting the apparatus operator to perform a task is displayed on the alert display region 403. Here, "waste liquid tank (W1)" is a term directed to the apparatus operator, and represents the first waste liquid tank 107 in the present embodiment. When the "Apparatus Plan View" button is selected by being pressed in the display switching buttons 401 in the state where the alert is displayed, display switches as shown in FIG. 4B, and the location of the first waste liquid tank 107 that is to be emptied is clearly shown in the layout chart. In other words, the unit related to the alert is displayed in an identifiable manner.

Figure 8:
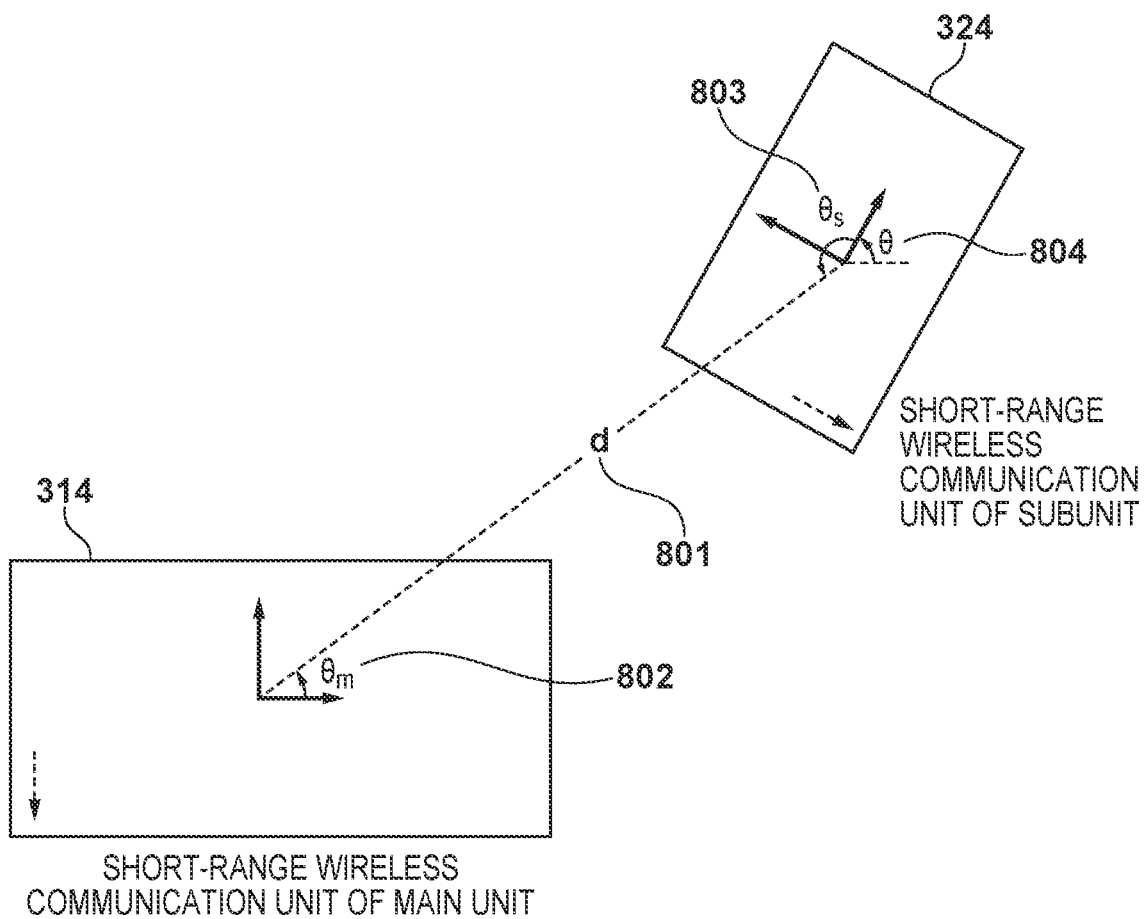
FIG. 8 is an illustrative diagram of relative coordinates of a main unit and a subunit according to the first embodiment.

Next, a technique for generating the above layout chart on the display screen according to the present embodiment will be described. In terms of the overall flow, the CPU 311 of the main unit control unit 310 measures the relative coordinate information of each unit, and stores this information in a table. Next, the CPU 311 generates an overall layout chart of the units with reference to the information in the table. Note that the relative coordinate information includes the distance and direction between units and the orientation of each unit, and an example thereof is shown in FIG. 8. Also, in the present embodiment, the relative positions of the subunits are specified on the basis of the position of the main unit 101.

FIG. 8 shows the positional relationship between the short-range wireless communication unit 314 of the main unit control unit 310 and the short-range wireless communication unit 324 of the subunit control unit 320. It is assumed that the origin of the coordinate system of each short-range wireless communication unit is the origin of the coordinate system of each unit, and that a coordinate system is defined for every unit. The coordinate axes of the units are indicated with solid arrows.

Also, in FIG. 8, the frontal direction of the main unit 101 and the subunit is indicated with broken arrows, in correspondence with the coordinate system of the respective units. The positional relationship between the short-range wireless communication units is treated as substantively the positional relationship between the units. Accordingly, in the following description, the positional relationship between the short-range wireless communication units may be represented as the positional relationship between the units. Also, in the present embodiment, with regard to the installation arrangement of the units, distance, direction and posture are represented as two-dimensional distance, direction and posture in a plan view looking at the apparatus from above. Although a plurality of subunits are provided, as described above, the following description will be given taking the positional relationship between one subunit and the main unit 101 shown in FIG. 8 as an example.

d shown in FIG. 8 represents a distance 801 between the main unit 101 and the subunit. $\theta_m$ represents a direction 802 of the subunit viewed from the main unit 101. $\theta_s$ represents a direction 803 of the main unit 101 viewed from the subunit. $\theta$ represents an orientation 304 of the subunit viewed from the main unit 101. $\theta$ is, in other words, the inclination of the coordinate system of the short-range wireless communication unit 324 viewed from the coordinate system of the short-range wireless communication unit 314.

Subunit Coordinate Registration Processing

Figure 6:
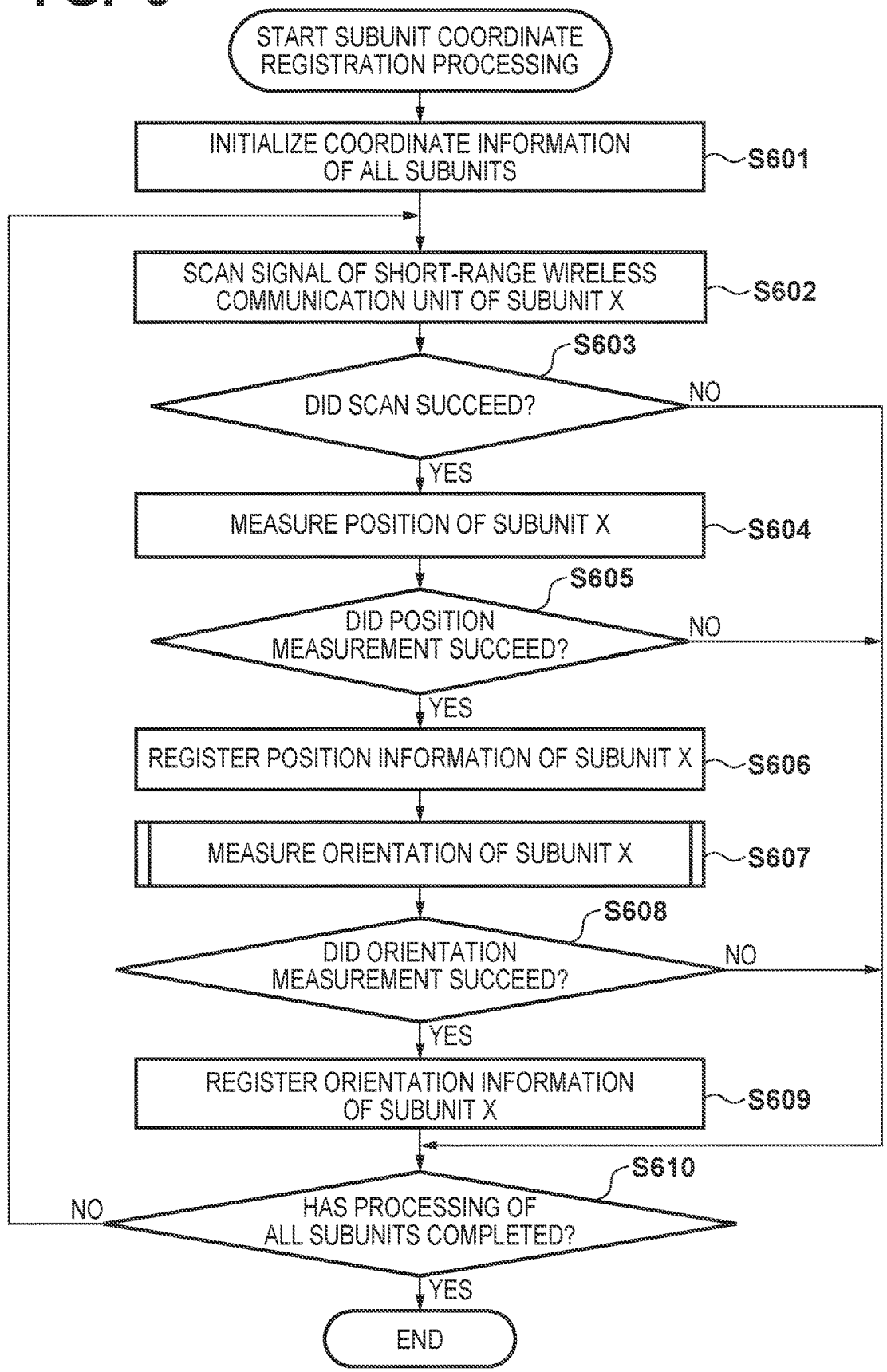
FIG. 6 is a flowchart showing subunit coordinate registration processing according to the first embodiment.

FIG. 6 is a flowchart showing subunit coordinate registration processing according to the present embodiment. Processing of this flow is realized by a corresponding program being read out and executed by the CPU 311 of the main unit control unit 310. This processing is premised on the short-range wireless communication unit 324 of the subunit control unit 320 operating in an advertiser mode and sending an advertising signal. Also, it is assumed that the short-range wireless communication unit 314 of the main unit control unit 310 starts up in a scanner mode, and is in a state capable of receiving the advertising signal.

In step S601, the CPU 311 initializes the coordinate information of all the subunits. Here, "subunit" refers to each unit having the subunit control unit 320. In the present embodiment, the DFE 102, the first power unit 103, the second power unit 104, the consumable liquid unit 105, the ink tank unit 106, the first waste liquid tank 107, and the second waste liquid tank 108 are the subunits. Also, the coordinate information initialization processing is, specifically, processing for setting the value of distance information 503, direction information 504 and orientation information 506 of each subunit in a subunit coordinates table 500 shown in FIG. 5 to an initial value. A specific value indicating unset, such as "−1", for example, may be set as the initial value at this time. A subunit number 501 and a subunit name 502 may be set at the timing at which a new subunit is added. The subunit coordinates table 500 is held in the RAM 312. Also, the processing result of the subunit coordinate registration processing implemented last time may be held in a predetermined storage area as history information, at the time of this initialization processing.

Hereinafter, the processing of steps S602 to S610 is performed on all the subunits. A keyword "subunit X" that is used in the following description is given in place of the name of each subunit. Here, it is assumed that the subunits are processed as the subunit X of interest in order of the values set in the subunit number 501 of FIG. 5.

In step S602, the CPU 311 scans for the signal from the short-range wireless communication unit 324 of the subunit X using the short-range wireless communication unit 314. That is, the advertising signal that is issued by the short-range wireless communication unit 324 of the subunit X is scanned for by the short-range wireless communication unit 314 of the main unit 101. Note that the advertising signal includes information identifying the respective subunit. For example, the advertising signal that is transmitted by the DFE 102 includes "1" as an identification number, and the advertising signal that is transmitted by the first power unit 103 includes "2" as an identification number.

In step S603, the CPU 311 determines whether the short-range wireless communication unit 314 successfully scanned for the advertising signal from the subunit X. The CPU 311 advances to step S604 if it is determined that the short-range wireless communication unit 314 successfully scanned for the advertising signal (YES in step S603), and advances to step S610 if it is determined that the short-range wireless communication unit 314 failed (NO in step S603). For example, in the case where the CPU 311 scans for the advertising signal of the DFE 102, step S603 is realized by determining whether an advertising signal including the identification number "1" has been successfully scanned for.

In step S604, the CPU 311 analyzes the advertising signal using the short-range wireless communication unit 314, and measures the relative distance and direction of the short-range wireless communication unit 324 of the subunit X viewed from the short-range wireless communication unit 314 of the main unit 101. Here, as the direction measurement technique, the CPU 311 measures direction in accordance with the AoA (Angle of Arrival) or AoD (Angle of Departure) measurement method of Bluetooth 5.1 described above. Also, as the distance measurement technique, the CPU 311 measures distance by measuring TxPower and RSSI (Received Signal Strength Indication).

In step S605, the CPU 311 determines whether measurement performed on the subunit X was successful. The CPU 311 advances to step S606 if it is determined that measurement of distance and direction was successful (YES in step S605), and advances to step S610 if it is determined that measurement of distance and direction failed (NO in step S605). Note that information omission in the advertising signal is given as a reason for measurement failure.

In step S606, the CPU 311 registers numerical information (position information) of the distance and direction measured in step S604 in the items distance information 503 and direction information 504 of the targeted subunit in the subunit coordinates table 500.

In step S607, the CPU 311 measures the orientation of the subunit X. Orientation here is the relative posture of the subunit X viewed from the main unit 101, and is an angle represented by θ in FIG. 8. The processing of step S607 is shown in detail in FIG. 7.

Figure 7:
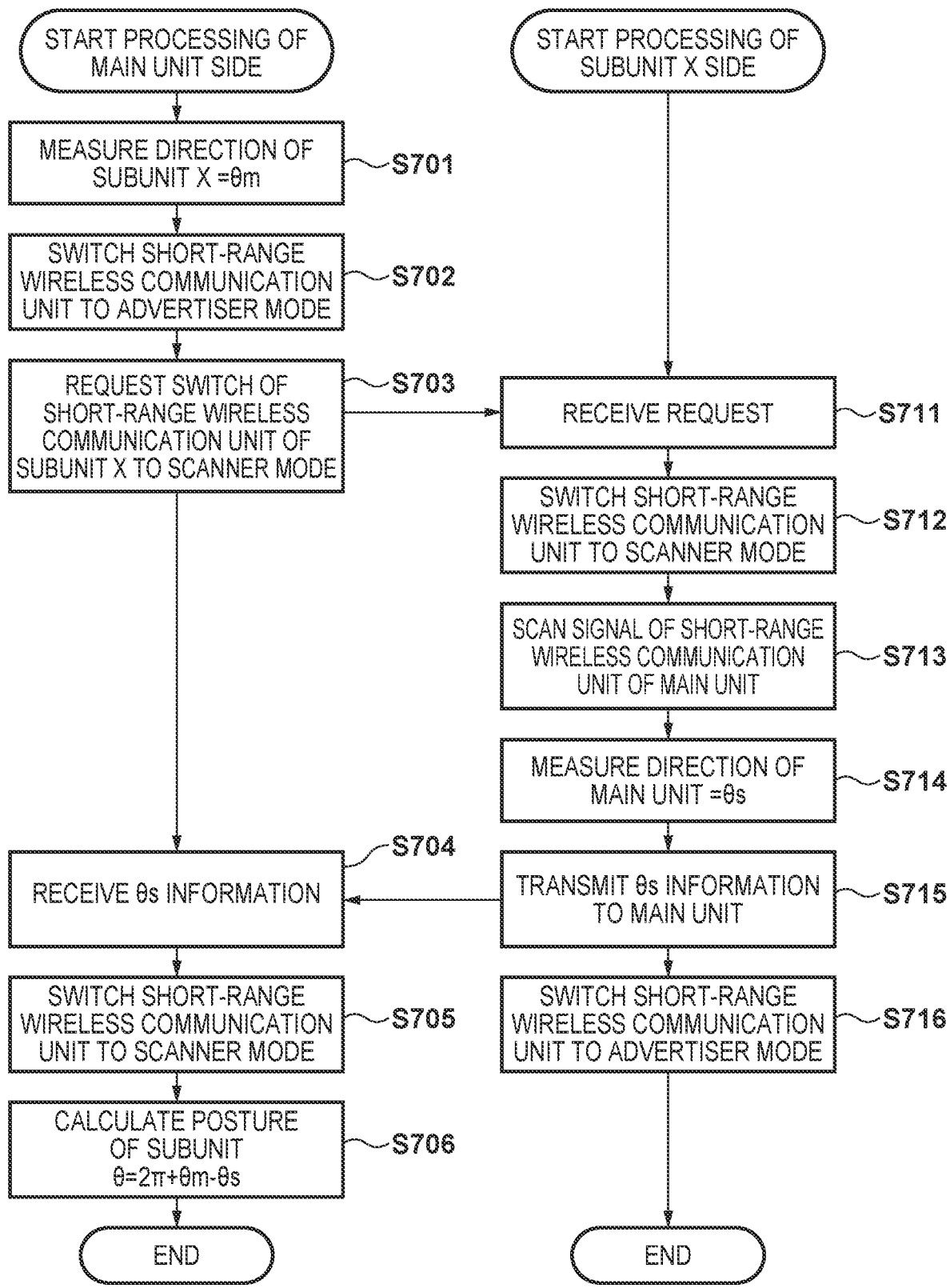
FIG. 7 is a flowchart showing subunit orientation measurement processing according to the first embodiment.

The flowchart shown in FIG. 7 is constituted by a flow (steps S701 to S706) that is executed by the CPU 311 of the main unit control unit 310, and a flow (steps S711 to S716) that is executed by the CPU 321 of the subunit control unit 320.

In step S701, the CPU 311 measures the direction $\theta_m$ of the subunit X. In actuality, this direction $\theta_m$ is equal to the direction information of the subunit X measured in step S604 of FIG. 6.

In step S702, the CPU 311 switches the operation mode of the short-range wireless communication unit 314 from the scanner mode to the advertiser mode, and starts sending the advertising signal. The advertising signal here is repeatedly sent at a predetermined advertising interval.

In step S703, the CPU 311 transmits, to the subunit control unit 320 of the subunit X, a request to switch the operation mode of the short-range wireless communication unit 324 of the subunit X to the scanner mode. Communication at this time is performed through the communication unit 315 and the communication unit 325.

In step S711, the CPU 321 of the subunit X receives the request transmitted from the main unit 101.

In step S712, the CPU 321 switches the operation mode of the short-range wireless communication unit 324 from the advertiser mode to the scanner mode, based on the request received in step S711.

In step S713, the CPU 321 scans for the advertising signal issued by the short-range wireless communication unit 314 of the main unit 101, using the short-range wireless communication unit 324.

In step S714, the CPU 321 measures the direction $\theta_s$ of the main unit 101 viewed from the subunit X, using the short-range wireless communication unit 324. As the measurement technique here, measurement is performed in accordance with the AoA (the angle of arrival) or AoD (Angle of Departure) measurement method of Bluetooth 5.1. Accordingly, the processing may be equivalent to step S604 in FIG. 6.

In step S715, the CPU 321 transmits information on $\theta_s$ measured in step S714 to the main unit control unit 310, through the communication unit 325 and the communication unit 315.

In step S716, the CPU 321 switches the operation mode of the short-range wireless communication unit 324 from the scanner mode to the advertiser mode.

In step S704, the CPU 311 of the main unit control unit 310 receives the information on $\theta_s$ transmitted from the subunit X.

In step S705, the CPU 311 switches the operation mode of the short-range wireless communication unit 314 from the advertiser mode to the scanner mode.

In step S706, the CPU 311 computes θ which is the orientation of the subunit X viewed from the main unit 101 in accordance with equation (3).

$$\theta = 2\pi + \theta_m - \theta_s \qquad (3)$$

Description will now return to the flowchart of FIG. 6. In step S608, the CPU 311 of the main unit control unit 310 determines whether measurement of the orientation of the subunit X was successful in the processing of step S607. The CPU 311 advances to step S609 if it is determined that measurement of the orientation of the subunit X was successful (YES in step S608), and advances to step S610 if it is determined that measurement of the orientation of the subunit X failed (NO in step S608). Note that a problem of some sort with communication, calculation processing or the like is given as a cause of measurement failure.

In step S609, the CPU 311 registers orientation information of the subunit X. Specifically, the orientation information is registered in the item orientation information 505 of the targeted subunit in the subunit coordinates table 500. Note that orientation information is, specifically, angle information.

In step S610, the CPU 311 determines whether the coordinate registration processing has been completed for all the subunits. The CPU 311 returns to step S602 if it is determined that processing has not been completed on all the subunits (NO in step S610), and the processing is repeated targeting the subunit whose number is next in the subunit coordinates table 500. On the other hand, the CPU 311 ends this processing flow if it is determined that processing has been completed on all the subunits (YES in step S610). At the point in time at which this processing flow ends, information on the distance, direction and orientation of each subunit is registered in the subunit coordinates table 500.

The initial value set in the processing of step S601 will, however, be registered for items with respect to which measurement failed.

Layout Chart Generation Processing

Figure 9:
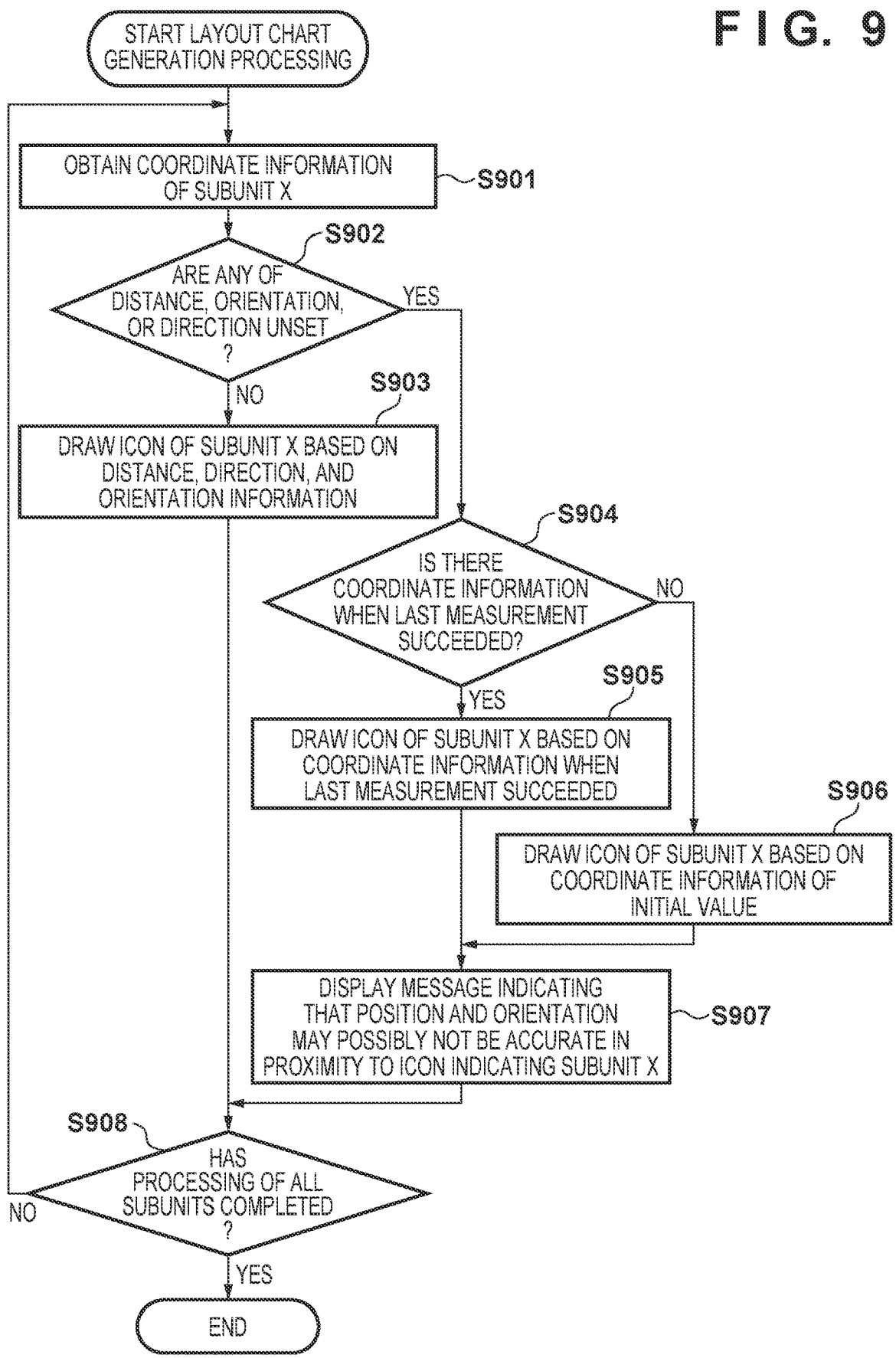
FIG. 9 is a flowchart showing layout chart generation processing according to the first embodiment.

Next, layout chart generation processing according to the present embodiment will be described using the flowchart of FIG. 9. The flowchart of FIG. 9 is executed by the CPU 311 of the main unit control unit 310. This processing is premised on the coordinate registration processing of each subunit shown in FIG. 6 having been completed.

In step S901, the CPU 311 obtains the coordinate information of a subunit X. Here, "subunit X" indicates the subunits, synonymously with the subunit X described in the flowchart of FIG. 6. When obtaining the coordinate information of the subunit X, information on the items distance information 503, direction information 504 and orientation information 505 of the corresponding subunit in the subunit coordinates table 500 is obtained, with the subunits being processed as the subunit X of interest in order of the values set in the subunit number 501.

In step S902, the CPU 311 determines whether the information on any of distance, direction and orientation for the subunit X is in an unset state. For example, this unset state arises in the case where the value of any of the items in the subunit coordinates table 500 is the initial value (e.g., "−1"), in the processing of FIG. 6. The CPU 311 advances to step S904 if it is determined that there is unset information (YES in step S902), and advances to step S903 if that is not the case (NO in step S902).

In step S903, the CPU 311 performs screen drawing by arranging an icon representing the subunit X on an apparatus plan view screen, in accordance with the obtained distance, direction and orientation information. At the time of icon arrangement, the distance information is reflected with an appropriate reduction scale. Note that the type of icon representing the subunit X is assumed to be defined in advance, according to the shape, function or the like of the subunit X. Also, the icon representing the main unit 101 is also assumed to be defined in advance. Note that a configuration may be adopted in which the icon representing the main unit 101 is arranged on the apparatus plan view screen in advance, and the reduction scale and the like thereof is adjusted following the icon representing the subunit X being displayed. Also, the size of the icon may be defined according to the size of the units. Also, the degree of the reduction in scale of the respective icons may be adjusted, according to the layout positioning between units. Also, the CPU 311 reads out an icon to be displayed from a memory in the case where the angle indicated by the orientation information is 0 degrees, and rotates the icon in a predetermined direction (e.g., counterclockwise) based on the angle information obtained in step S901. As a result of this processing, it becomes possible for the CPU 311 to represent the orientation of the subunit X relative to the main unit on the screen.

In step S904, the CPU 311 determines whether there is coordinate information from when measurement was successfully performed last time on the subunit X. The CPU 311 advances to step S905 (YES in step S904) if it is determined that there is coordinate information from when measurement was successfully performed last time, and advances to step S906 if it is determined that there is not coordinate information from last time (NO in step S904). Here, coordinate information from when measurement was successfully performed last time is assumed to be a value of the subunit coordinates table 500 registered after subunit coordinate registration processing was performing in the past, and to be stored in a predetermined storage area as history information. Also, when past information of the subunit coordinates table 500 is held as history information, time information indicating when measurement was performed is held in association therewith. The CPU 311 may also determine whether this information can be utilized as the coordinate information from last time according to whether a fixed time has elapsed from the time indicated by the time information.

In step S905, the CPU 311 arranges the icon representing the subunit X on the apparatus plan view screen using the distance, direction and orientation information from when measurement was successfully performed last time. At the time of icon arrangement, the distance information is reflected with an appropriate reduction scale. The CPU 311 then advances to step S907.

In step S906, the CPU 311 arranges the icon representing the subunit X on the apparatus plan view screen, using the initial value information on distance, direction and orientation. At the time of icon arrangement, the distance information is reflected with an appropriate reduction scale. Initial value information here is the distance, direction and orientation information in one example of unit arrangement of the printing apparatus that is stored as program data in the ROM 313 in advance. The CPU 311 then advances to step S907.

In step S907, the CPU 311 displays a message indicating that the position and orientation may possibly not be accurate in proximity to the icon indicating the subunit X. Note that the contents of the message that is displayed here is not particularly limited, and an icon or the like may be displayed besides a message. The CPU 311 then advances to step S908.

In step S908, the CPU 311 determines whether the arrangement processing has been completed for all the subunits. The CPU 311 returns to step S901 if it is determined that processing has not been completed on all the subunits (NO in step S908), and the processing is repeated targeting the subunit whose number is next in the subunit coordinates table 500. On the other hand, the CPU 311 ends this processing flow if it is determined that processing has been completed on all the subunits (YES in step S908).

Note that a mechanism for the user to modify the position and orientation of the icons indicating the subunits by operating the touch panel display 109 may be adopted, assuming that the accuracy of the position and orientation is poor in the generated layout chart. For example, the layout chart may be configured to be modifiable based on visual measurement by the user or actual measurement, by moving the icon of the subunit X through a drag-and-drop operation, changing the orientation through a rotation operation, or the like.

Also, the conceivable reason for the accuracy being poor may be collectively displayed in the message that is displayed in step S907 of FIG. 9. Specifically, a message indicating that the layout chart has been created based on past position information may be displayed. Also, the reason for the position information being unset may be collectively displayed. Specifically, information indicating the possibility that position information could not be measured due to the subunit having been moved to a position out of the communicable range of Bluetooth 5.1 may be displayed.

In the present embodiment, the coordinate registration processing (FIG. 6) and layout chart generation processing (FIG. 9) of the subunit are described separately, but, in terms of the implementation timing, the coordinate registration processing and the layout chart generation processing may be implemented continuously when the apparatus starts up, or may be implemented independently. For example, a configuration may be adopted in which the coordinate registration processing is implemented periodically, and the layout chart generation processing is implemented when the apparatus plan view is selected with the display switching buttons 401 on the touch panel display 109. Alternatively, a configuration may be adopted in which the coordinate registration processing is implemented periodically, and the layout chart generation processing is only performed in the case where a value registered in the subunit coordinates table 500 is updated.

Also, when generating the layout chart, information relating to the task to be performed on the apparatus or the like may dynamically change depending on the layout of the units. For example, as shown in FIG. 4B, the icon of the waste liquid tank that is to be emptied may be displayed in a different color, and an arrow symbol indicating the icon may be drawn.

Furthermore, a configuration may be adopted in which the contents of the task procedure directed to the apparatus operator that are displayed on the screen are switched, depending on the layout of the units. For example, with regard to the wording that is displayed in the alert display region 403, in the case where the first waste liquid tank 107 is arranged on the back side of the main unit 101, "Please go around to the back of the apparatus and perform the task" is displayed. On the other hand, in the case where the first waste liquid tank 107 is arranged on the front side of the apparatus, display may be switched to "The task needs to be performed at the front of the apparatus".

Figure 10C:
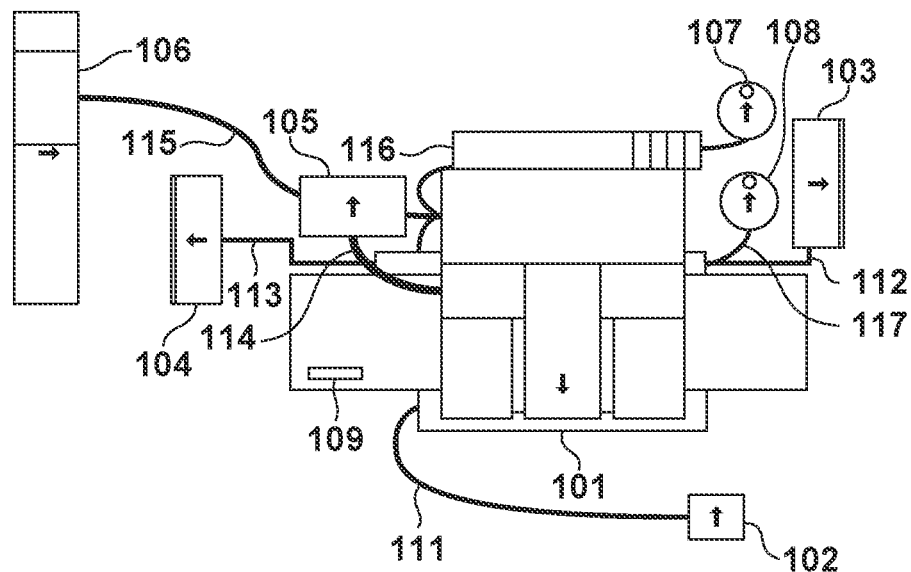
Figure 10D:
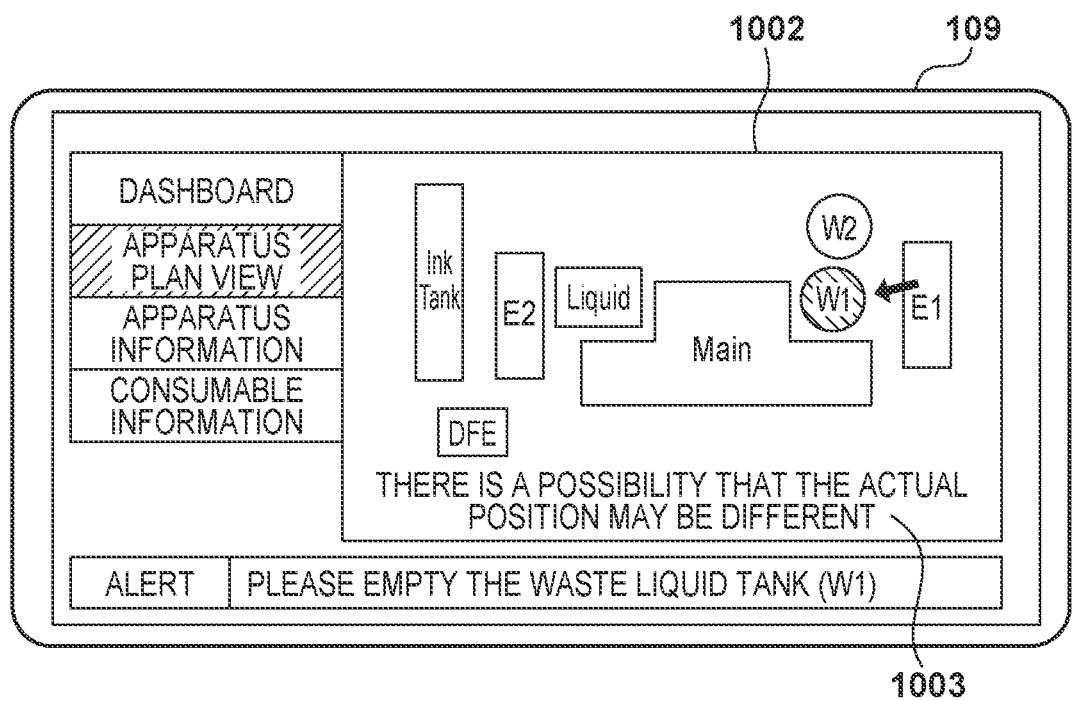

The combination of FIGS. 10A and 10B and the combination of FIGS. 10C and 10D show example display of layout charts corresponding to two types of unit arrangement that are based on the above. As shown in FIGS. 10A to 10D, layout charts 1001 and 1002 generated when the "Apparatus Plan View" button is pressed and the display contents (message 1003) differ, according to the positional relationship between the units. In this way, display control is performed, such that the contents (messages, icons, etc.) that are displayed in association with the generated layout chart are displayed in a changed manner, according to the layout chart.

As described above, according to the present embodiment, a more accurate positional relationship between the devices that uses short-range wireless communication is specified, and automatic reconfiguration of the layout chart on a UI becomes possible, according to the actual arrangement state of the units. Thus, the apparatus operator can be provided with a precise illustration tailored to the state of the apparatus.

Second Embodiment

A second embodiment according to the claimed invention describes a mode in which the claim invention is applied to a large inkjet printing apparatus similarly to the first embodiment. Hereinafter, description will focus on the difference portions, with reference to the contents of the first embodiment. Since the overall configuration of the printing apparatus and typical tasks that the operator performs on the units of the printing apparatus are similar to the first embodiment, description thereof will be omitted.

The control unit of each unit of the printing apparatus according to the present embodiment will be described using FIG. 11. The configuration of the main unit 101 is similar to the configuration described using FIG. 3 in the first embodiment. On the other hand, the DFE 102, the first power unit 103, the second power unit 104, the consumable liquid unit 105, the ink tank unit 106, the first waste liquid tank 107 and the second waste liquid tank 108 according to the present embodiment each have a control unit indicated by a subunit control unit 330 in FIG. 11. That is, in the present embodiment, there are a plurality of subunit control units 330.

The subunit control unit 330 is the control part of each unit other than the main unit 101. The subunit control unit 330 is constituted to include a ROM 333, a RAM 332, a CPU 331, a mechatronics control unit 337, a communication unit 336, a first short-range wireless radio communication unit 334, and a second short-range wireless radio communication unit 335. The configuration within the subunit control unit 330 is equivalent to the configuration of the main unit control unit 310 apart from not having an UI control unit and having two short-range wireless communication units. It is assumed that the first short-range wireless radio communication unit 334 and the second short-range wireless radio communication unit 335 use Bluetooth 5.1 as the communication method, similarly to the short-range wireless communication unit 314 of the main unit control unit 310. The first short-range wireless radio communication unit 334 and the second short-range wireless radio communication unit 335 have independent device IDs, and send advertising signals as separate devices. The remaining configuration is similar to the configuration described using FIG. 3 in the first embodiment.

Layout Chart Generation Processing

Figure 12:
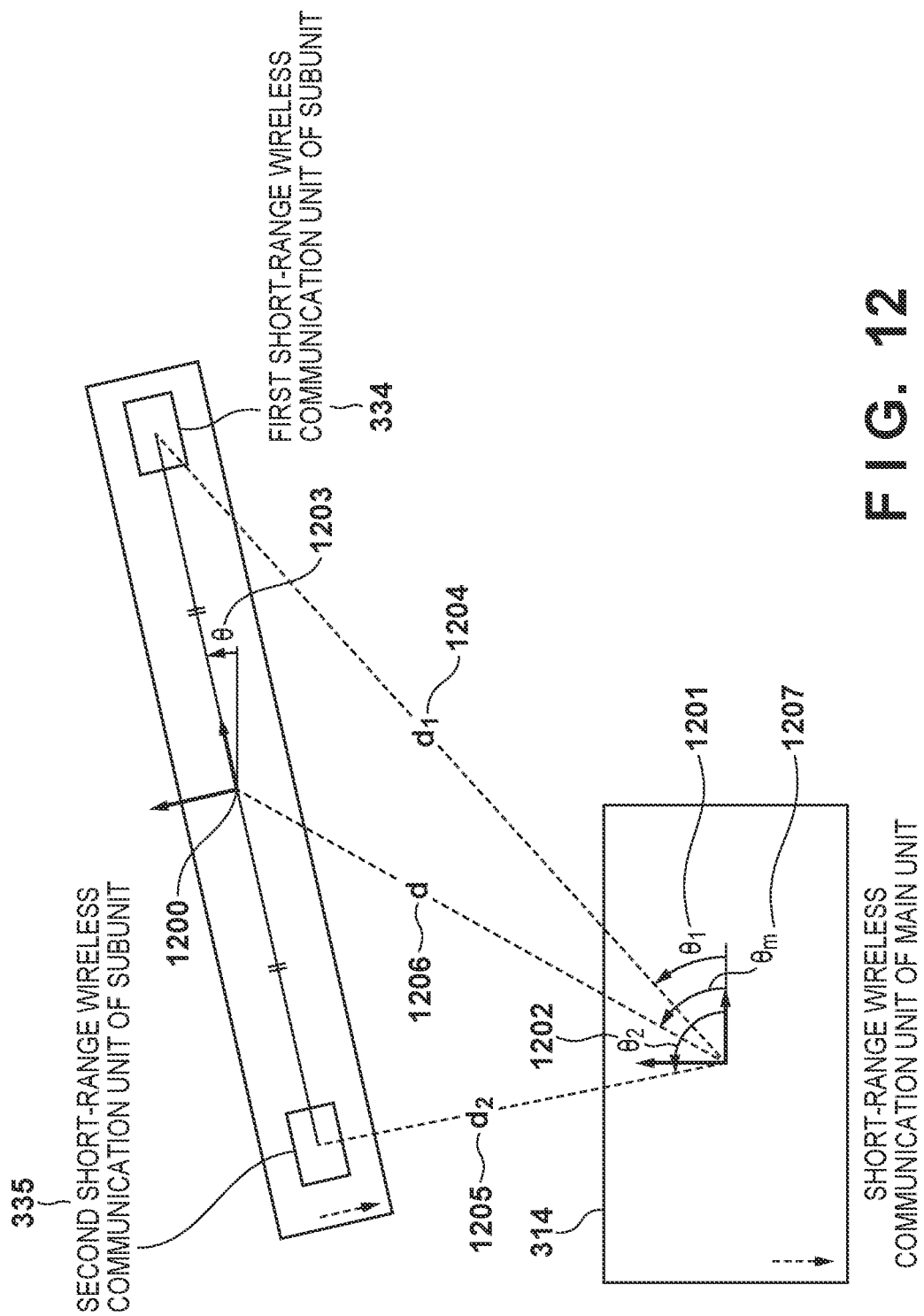
FIG. 12 is a diagram of relative coordinates of a main unit and a subunit according to the second embodiment.

Next, processing for generating a layout chart on a display screen according to the present embodiment will be described. The overall flow is similar to the first embodiment. Relative coordinate information includes distance, direction and orientation, and an example thereof is shown in FIG. 12. FIG. 12 shows the positional relationship between the short-range wireless communication unit 314 of the main unit control unit 310 and the first short-range wireless radio communication unit 334 and the second short-range wireless radio communication unit 335 of the subunit control unit 330. With regard to the main unit 101, the origin of the coordinate system of the short-range wireless communication unit 314 is given as the origin of the coordinate system of the main unit 101. Also, with regard to the subunit, a coordinatial midpoint 1200 of the first short-range wireless radio communication unit 334 and the second short-range wireless radio communication unit 335 is given as the origin of the coordinate system of the subunit.

In the present embodiment, the focus is on the installation arrangement of the units, and thus distance and posture are represented as two-dimensional distance and posture in a plan view looking at the apparatus from above. Also, in FIG. 12, the frontal direction of the main unit 101 and the subunit is shown with broken arrows, in correspondence with the coordinate system of each unit. Although a plurality of subunits are provided, as described above, the following description will be given taking the positional relationship between one subunit and the main unit 101 shown in FIG. 12 as an example.

d in FIG. 12 represents a distance 1206 between the main unit 101 and the subunit. $d_1$ represents a distance 1204 between the main unit 101 and the first short-range wireless radio communication unit 334 of the subunit. $d_2$ represents a distance 1205 between the main unit 101 and the second short-range wireless radio communication unit 335 of the subunit. $\theta_1$ represents a direction 1201 of the first short-range wireless radio communication unit 334 of the subunit viewed from the main unit 101. $\theta_2$ represents a direction 1202 of the second short-range wireless radio communication unit 335 of the subunit viewed from the main unit 101. $\theta$ represents an orientation 1203 of the subunit viewed from the main unit 101. θ is, in other words, the inclination of the coordinate system of the subunit viewed from the coordinate system of the main unit 101. Also, $θ_m$ is a direction 1207 of the subunit viewed from the main unit 101. Note that, as shown in FIG. 12, the first short-range wireless radio communication unit 334 and the second short-range wireless radio communication unit 335 of the subunit control unit 330 are arranged in the subunit with a physical distance therebetween.

Subunit Coordinate Registration Processing

Figure 13:
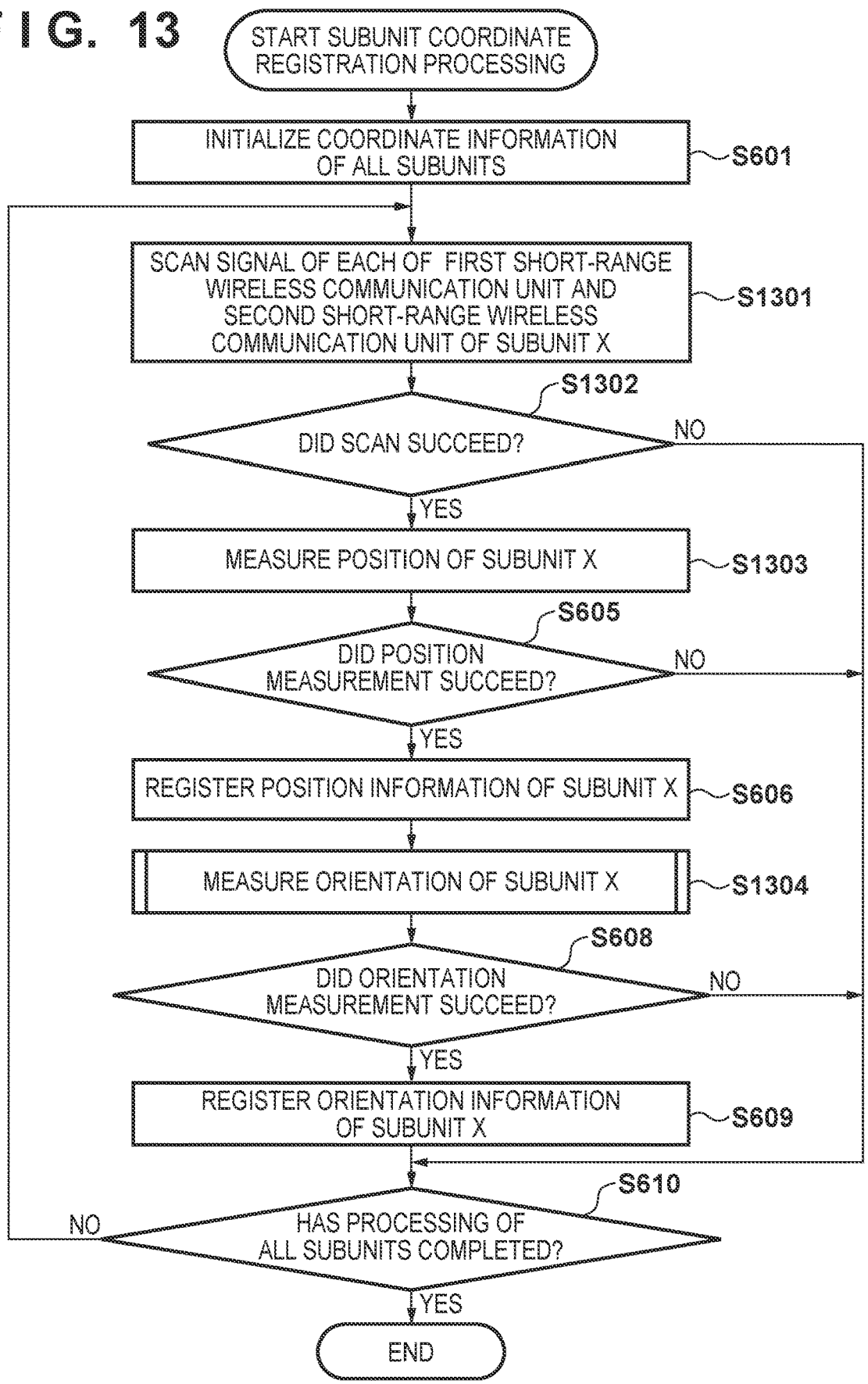
FIG. 13 is a flowchart showing subunit coordinate registration processing according to the second embodiment.

FIG. 13 is a flowchart showing subunit coordinate registration processing according to the present embodiment. The processing of this flow is executed by the CPU 311 of the main unit control unit 310. This processing is premised on the first short-range wireless radio communication unit 334 and the second short-range wireless radio communication unit 335 of the subunit control unit 330 operating in the advertiser mode, and sending advertising signals separately. Also, it is assumed that the short-range wireless communication unit 314 of the main unit control unit 310 starts up in the scanner mode, and is in a state capable of receiving the advertising signal. Note that the same reference numerals are given to processing that is the same as FIG. 6 described in the first embodiment, and description thereof will be omitted.

After performing initialization processing in step S601, the CPU 311, in step S1301, scans for the signal of the short-range wireless communication units of the subunit X using the short-range wireless communication unit 314. That is, the advertising signal that is sent by the first short-range wireless radio communication unit 334 and the second short-range wireless radio communication unit 335 of the subunit X is scanned for by the short-range wireless communication unit 314 of the main unit 101.

In step S1302, the CPU 311 determines whether the short-range wireless communication unit 314 successfully scanned for the advertising signals sent by the first short-range wireless radio communication unit 334 and the second short-range wireless radio communication unit 335 of the subunit X. The CPU 311 advances to step S1303 if it is determined that the short-range wireless communication unit 314 successfully scanned for the advertising signals (YES in step S1302), advances to step S610 if it is determined that the short-range wireless communication unit 314 failed (NO in step S1302).

In step S1303, the CPU 311 analyzes the advertising signals using the short-range wireless communication unit 314. The CPU 311 then measures relative distances $d_1$ and $d_2$ and orientations $θ_1$ and $θ_2$ of the first short-range wireless radio communication unit 334 and the second short-range wireless radio communication unit 335 of the subunit X viewed from the short-range wireless communication unit 314 of the main unit 101. As the measurement technique here, measurement is performed in accordance with the AoA (the angle of arrival) or AoD (Angle of Departure) measurement method of Bluetooth 5.1. When a geometrical calculation is performed using the distance and direction information obtained here, the relative distance d and orientation $θ_m$ of the subunit X is computed in accordance with equations (4) and (5).

$$d=((x_1-x_2)^2+(y_1-y_2)^2)^{1/2} \quad (4)$$

$$θ_m=\tan^{-1}((x_1+x_2)/(y_1+y_2)) \quad (5)$$

(where $x_1=d_1 \cos θ_1$, $x_2=d_2 \cos θ_2$, $y_1=d_1 \sin θ_1$, $y_2=d_2 \sin θ_2$) Thereafter, the CPU 311 advances to step S605.

After the registration processing (step S606) of the position information of the subunit X, the CPU 311, in step S1304, measures the orientation of the subunit X. Orientation here is the relative posture of the subunit X viewed from the main unit 101, and is an angle represented by θ in FIG. 12. The processing of step S1304 is shown in detail in FIG. 14.

Figure 14:
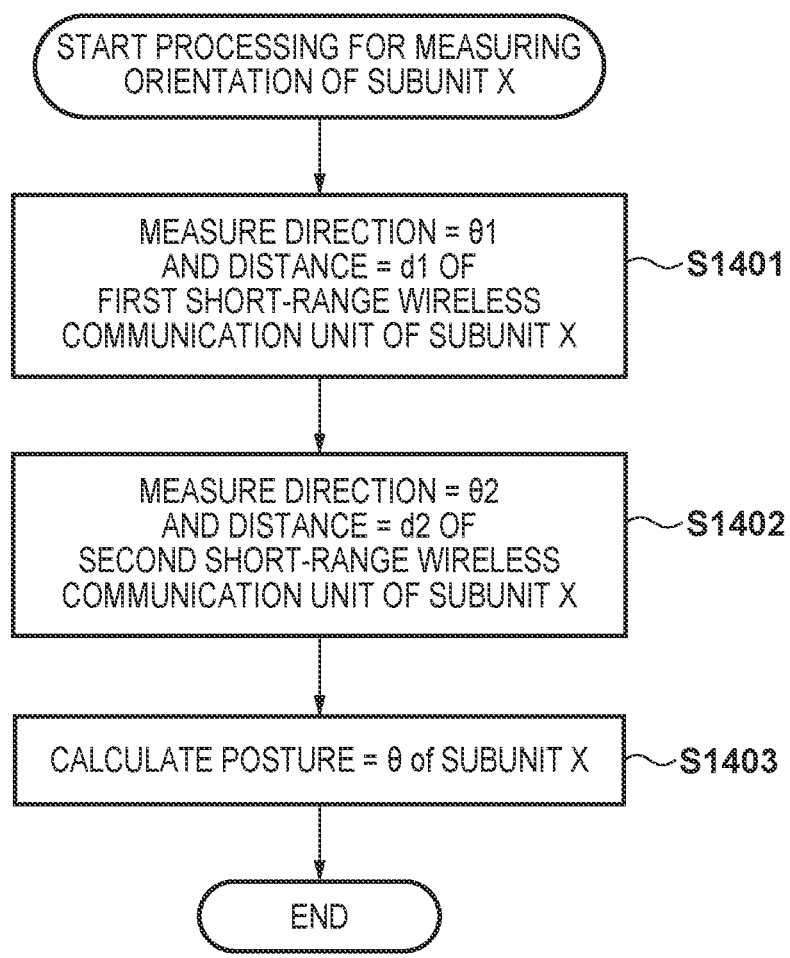
FIG. 14 is a flowchart showing subunit orientation measurement processing according to the second embodiment.

The flowchart shown in FIG. 14 is executed by the CPU 311 of the main unit control unit 310.

In step S1401, the CPU 311 measures the relative distance $d_1$ and orientation $θ_1$ of the first short-range wireless radio communication unit 334 of the subunit X viewed from the short-range wireless communication unit 314 of the main unit 101. The measurement value here is the value measured in the processing of step S1303 in FIG. 13.

In step S1402, the CPU 311 measures the relative distance $d_2$ and orientation $θ_2$ of the second short-range wireless radio communication unit 335 of the subunit X viewed from the short-range wireless communication unit 314 of the main unit 101. The measurement value here is the value measured in the processing of step S1303 in FIG. 13.

In step S1403, the CPU 311 computes θ which is the orientation of the subunit X viewed from the main unit 101, in accordance with equation (6).

$$θ=\tan^{-1}((x_1-x_2)/(y_1-y_2)) \quad (6)$$

(where $x_1=d_1 \cos θ_1$, $x_2=d_2 \cos θ_2$, $y_1=d_1 \sin θ_1$, $y_2=d_2 \sin θ_2$)

The CPU 311 then ends this processing flow, and advances to step S608 in FIG. 13.

Note that at the point in time of the end of the processing flow shown in FIG. 13, information on the distance, direction and orientation of each subunit is registered in the subunit coordinates table 500. The initial value will, however, be registered for items with respect to which measurement failed.

Note that since steps S608 to S610 after step S1304 are similar to the first embodiment, description thereof will be omitted. The coordinate registration processing (FIG. 12) and layout chart generation processing (FIG. 9) of the subunit are also separated in the present embodiment, similarly to the first embodiment, but the implementation timing thereof may be any timing as described in the first embodiment. Also, when generating the layout chart, information relating to the task to be performed on the apparatus or the like may dynamically change depending on the layout of the units, similarly to the first embodiment.

Also, the processing of the first embodiment and the processing of the second embodiment may be combined. For example, in the plurality of subunits constituting the printing apparatus, the case where the configuration of the subunit control unit 320 of FIG. 3 described in the first embodiment is mixed with the configuration of the subunit control unit 330 of FIG. 11 described with the second embodiment is envisioned. In such a case, a configuration may be adopted in which, after having specified the configuration of the subunit control unit in the subunits, the coordinate registration processing of one of the first embodiment and the second embodiment is switched and executed.

As described above, according to the present embodiment, even with a subunit configuration that differs from the first embodiment, a more accurate positional relationship between the devices that uses short-range wireless communication is specified, and automatic reconfiguration of the layout chart of a UI becomes possible, according to the actual arrangement state of the units. Thus, the apparatus operator can be provided with a precise illustration tailored to the state of the apparatus.

Third Embodiment

It is known that since distance and direction measurement in the BLE standard of Bluetooth 5.1 uses the radio field strength of the advertising signal, measurement accuracy deteriorates when the short-range wireless communication units are at a distance from each other. Based on this, an embodiment that raises the measurement accuracy of the position and orientation information of the subunits over the first embodiment will be described as a third embodiment of the claimed invention. Description of the basic configuration and the layout chart generation flow overlaps with the first embodiment, and will thus be omitted, and only the characteristic configuration will be described.

In the present embodiment, the main unit control unit 310 in FIG. 3 has a plurality of short-range wireless communication units (e.g., three short-range wireless radio communication units 314a, 314b, 314c) instead of the short-range wireless communication unit 314. Also, the subunit control unit 320 in FIG. 3 has a plurality of short-range wireless communication units (e.g., three short-range wireless radio communication units 324a, 324b, 324c) instead of the short-range wireless communication unit 324. It is assumed that the short-range wireless communication units 314a, 314b and 314c and the short-range wireless communication unit 324a, 324b, and 324c are modules conforming to the BLE standard of Bluetooth 5.1 that each have an individual device ID.

In the processing for measuring the position of the subunit X in step S604 of FIG. 6 and the flow for measuring the orientation of the subunit X in FIG. 7, measurement of position and orientation is performed using the above plurality of short-range wireless communication units. First, the distance and direction of each of the short-range wireless communication units 314a, 314b and 314c of the main unit control unit 310 with respect to each of the short-range wireless communication units 324a, 324b and 324c of the subunit control unit 320 are respectively measured. The final distance d and orientation $\theta_m$ are then computed, by coordinate converting the measurement results into distance and direction values of the subunit X viewed from the coordinate system of the main unit 101, based on the physical arrangement information of the antennas of each short-range wireless communication unit, and further deriving the average value of the results.

Furthermore, the distance and direction of each of the short-range wireless communication unit 324a, 324b, and 324c of the subunit control unit 320 with respect to each of the short-range wireless communication units 314a, 314b and 314c of the subunit control unit 320 are respectively measured. The final direction $\theta_s$ is computed, by coordinate converting the measurement results into distance and direction values of the main unit viewed from the coordinate system of the subunit X, based on the physical arrangement information of the antennas of the short-range wireless communication units, and further deriving the average value of the results. The orientation $\theta$ of the subunit X is then computed using the obtained $\theta_m$ and $\theta_s$.

As described above, in the present embodiment, it becomes possible to reduce the influence of error and to improve measurement accuracy, compared with the first embodiment, by using the measurement results of the plurality of short-range wireless communication units. Note that, in the present embodiment, an example was described in which the main unit control unit 310 and the subunit control unit 320 each have three short-range wireless radio communication units, but there is no particular constraint on the number of short-range wireless communication units. Also, a configuration may be adopted in which one of the main unit control unit 310 and the subunit control unit 320 has only one short-range wireless radio communication unit.

Fourth Embodiment

As mentioned in the third embodiment, it is known that the measurement accuracy of distance and direction in the BLE standard of Bluetooth 5.1 deteriorates when the short-range wireless communication units are at a distance from each other. In view of this, an embodiment that raises the measurement accuracy of the position and orientation information of the subunits over the second embodiment will be described as a fourth embodiment of the claimed invention. Description of the basic configuration and the layout chart generation flow overlap with the second embodiment, and will thus be omitted, and only the characteristic configuration will be described.

In the present embodiment, the main unit control unit 310 in FIG. 11 has a plurality of short-range wireless communication units (e.g., three short-range wireless radio communication units 314a, 314b, 314c) instead of the short-range wireless communication unit 314. Also, the subunit control unit 330 in FIG. 11 has a plurality of first short-range wireless radio communication units (e.g., three first short-range wireless radio communication units 334a, 334b, 334c) instead of the first short-range wireless radio communication unit 334. Furthermore, the subunit control unit 330 has a plurality of second short-range wireless radio communication units (e.g., three second short-range wireless radio communication units 335a, 335b, 335c) instead of the second short-range wireless radio communication unit 335. The short-distance radio communication units 314a to 314c, the first short-range wireless radio communication units 334a to 334c, and the second short-range wireless radio communication units 335a to 335c are modules conforming to the BLE standard of Bluetooth 5.1 that each have an individual device ID.

In the processing for measuring the position of the subunit X in step S1303 of FIG. 13 and the flow for measuring the orientation of the subunit X in FIG. 14, measurement of the position and orientation is performed using the above plurality of short-range wireless communication units. First, the distance and direction of each the short-range wireless communication units 314a, 314b and 314c of the main unit control unit 310 with respect to each of the first short-range wireless radio communication units 334a, 334b and 334c of the subunit control unit 330 are respectively measured. The measurement results are then coordinate converted into distance and direction values of the first short-range wireless radio communication units of the subunit X viewed from the coordinate system of the main unit 101, based on the physical arrangement information of the antennas of the short-range wireless communication units. Furthermore, the final distance $d_1$ and direction $\theta_1$ are computed by deriving the average value of the results of the coordinate conversion.

Next, the distance and direction of each of the short-range wireless communication units 314a, 314b and 314c of the main unit control unit 310 with respect to the second short-range wireless radio communication units 335a, 335b and 335c of the subunit control unit 330 are respectively measured. The measurement results are then coordinate converted into distance and direction values of the second short-range wireless radio communication units of the subunit X viewed from the coordinate system of the main unit 101, based on the physical arrangement information of the antennas of the short-range wireless communication units. Furthermore, the final distance $d_2$ and direction $\theta_2$ are computed by deriving the average value of the results of the coordinate conversion. The relative distance d, direction $\theta_m$ and orientation $\theta$ of the subunit X are computed, using the distances $d_1$ and $d_2$ and directions $\theta_1$ and $\theta_2$ thus obtained.

As described above, in the present embodiment, it becomes possible to reduce the influence of error and to improve measurement accuracy, compared with the second embodiment, by using the measurement results of the plurality of short-range wireless communication units. Note that, in the present embodiment, an example was described in which the main unit control unit 310 and the subunit control unit 330 each have three short-range wireless radio communication units, but there is no particular constraint on the number of short-range wireless communication units.

Fifth Embodiment

In the above embodiments, techniques for generating the plan layout chart of a large inkjet printing apparatus were described. However, the application scope of the claimed invention is not limited to a plan view, and the claimed invention is also applicable to generation of a front view or a 3D view. Application to front view or 3D view generation will be described as a fifth embodiment.

In the present embodiment, it is assumed that, in an apparatus configuration similar to the first embodiment, the short-range wireless communication unit 314 of the main unit control unit 310 and the short-range wireless communication unit 324 of the subunit control unit 320 shown in FIG. 3 adopt an antenna configuration capable of three-dimensional direction measurement. In this case, in the processing for measuring the position of the subunit in step S604 of FIG. 6 and the flow for measuring the orientation of the subunit X in FIG. 7, height coordinates are computed similarly to computation of the coordinates on a plan view. The information on position and orientation thus computed is registered in the subunit coordinates table 500. A front view or a three-dimensional arrangement plan including information on the height direction of the apparatus is generated, by referring to this subunit coordinates table 500, with a similar procedure to the layout chart generation processing of FIG. 9 described in the first embodiment.

Note that although the above description was given based on the configuration of the first embodiment, the claimed invention is similarly applicable, even with the configurations from the second embodiment to the fourth embodiment, by providing the short-range wireless communication units with an antenna configuration capable of three-dimensional direction measurement. As described above, according to the present embodiment, automatic reconfiguration of the three-dimensional layout chart of a UI becomes possible, according to the actual arrangement state of the units.

Other Embodiments

In the above embodiments, examples that basically envision displaying a layout chart on the touch panel display 109 and performing display with respect to the apparatus operator were described. The claimed invention is, however, not limited to such as configuration, and, for example, information on a two-dimensional or three-dimensional layout chart of the units of an apparatus can also be presented to an operator who remotely monitors the apparatus or to a serviceperson who provides remote support. Since the arrangement state of the units constituting an apparatus (system) can thereby be ascertained without being at the installation site of the apparatus, more accurate and specific work instructions can be given to an onsite operator.

Also, although the above embodiments covered examples in which the claimed invention is applied to large inkjet printing apparatus, the application scope of the claimed invention is not limited thereto. For example, by applying the claimed invention in a factory employing a cell production method, and generating arrangement plans of the cells, it is possible to anticipate utilization of the claimed invention in areas such as creating intelligible work procedure manuals for workers or assisting in diagram creation for investigating the optimization of cell arrangement and orientation.

According to the present invention, more accurate presentation of the positional relationship between devices that uses short-range wireless communication becomes possible.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-103177, filed May 31, 2019 which is hereby incorporated by reference herein in its entirety.

What is claimed is:

1. A system comprised of a plurality of units each including a short-range wireless communication function capable of measuring position information relative to each other, comprising:

one or more processors; and
one or more memories that store a computer-readable instruction for causing, when executed by the one or more processors, the system to function as:
a specification part that specifies a positional relationship between the plurality of units, using information obtained by using the short-range wireless communication functions;
a determination part that uses the information obtained by using the short-range wireless communication functions to determine orientation information indicating orientation of a predetermined unit included in the plurality of units;
a generation part that generates a layout chart of the plurality of units, based on the positional relationship between the plurality of units specified by the specification part and based on the orientation information; and
a display part that causes a display to display the layout chart,
wherein information for enabling identification of a side of the predetermined unit that is to be operated by a user is indicated for an item of the predetermined unit included in the layout chart.

2. The system according to claim 1,
wherein the specification part specifies, as the positional relationship, at least one of a distance between the units, a relative direction between the units, and a relative posture between the units.

3. The system according to claim 1,
wherein the computer-readable instruction causes, when executed by the one or more processors, the system to further function as a part that holds, as history information, information on a past positional relationship specified by the specification part, and
wherein the generation part generates the layout chart using the history information, with respect to a unit whose positional relationship could not be newly specified by the specification part, among the plurality of units.

4. The system according to claim 1,
wherein the computer-readable instruction causes, when executed by the one or more processors, the system to further function as a part that holds an initial value for the positional relationship between the plurality of units, and
wherein the generation part generates the layout chart using the initial value, with respect to a unit whose positional relationship could not be specified by the specification part, among the plurality of units.

5. The system according to claim 1,
wherein the display part displays the layout chart in a manner capable of receiving modification of a position of icons respectively indicating the plurality of units arranged on the layout chart generated by the generation part.

6. The system according to claim 1,
wherein the plurality of units are constituted by one main unit and a plurality of subunits, and
wherein the specification part specifies the positional relationship between the plurality of subunits on a basis of the main unit.

7. The system according to claim 6,
wherein the main unit includes a print function, and each of the subunits is at least one of a power unit that functions as a power source, a consumable unit that supplies a consumable, and a tank unit that holds a consumable.

8. The system according to claim 1,
wherein the predetermined unit includes a plurality of short-range wireless communication parts, and
wherein the determination unit specifies, using information obtained by using the plurality of short-range wireless communication parts included in the predetermined unit, the orientation information indicating the predetermined unit.

9. The system according to claim 1,
wherein one unit includes a plurality of short-range wireless communication parts, and
wherein the specification part specifies the positional relationship between the plurality of units, based on position information measured using the plurality of short-range wireless communication parts included in each of the plurality of units.

10. The system according to claim 1,
wherein the short-range wireless communication functions use a Bluetooth 5.1 communication standard.

11. The system according to claim 1,
wherein the system is a printing apparatus.

12. A control method for a system comprised of a plurality of units each including a short-range wireless communication function capable of measuring position information relative to each other, comprising:
specifying a positional relationship between the plurality of units, using information obtained by using the short-range wireless communication functions;
using the information obtained by using the short-range wireless communication functions to determine orientation information indicating orientation of a predetermined unit included in the plurality of units;
generating a layout chart of the plurality of units, based on the specified positional relationship between the plurality of units and based on the orientation information; and
causing a display to display the layout chart,
wherein information for enabling identification of a side of the predetermined unit that is to be operated by a user is indicated for an item of the predetermined unit included in the layout chart.

13. The control method according to claim 12,
wherein at least one of a distance between the units, a relative direction between the units, and a relative posture between the units is specified as the positional relationship.

14. The control method according to claim 12,
wherein information on a specified past positional relationship is held as history information, and
wherein the layout chart is generated using the history information, with respect to a unit whose positional relationship could not be newly specified, among the plurality of units.

15. The control method according to claim 12,
wherein an initial value for the positional relationship between the plurality of units is held, and
wherein the layout chart is generated using the initial value, with respect to a unit whose positional relationship could not be specified, among the plurality of units.

16. The control method according to claim 12,
wherein the short-range wireless communication functions use a Bluetooth 5.1 communication standard.

17. The control method according to claim 12, wherein the system is a print apparatus.

18. The control method according to claim 12, wherein the plurality of units are constituted by one main unit and a plurality of subunits,
wherein the positional relationship between the plurality of subunits is specified on a basis of the main unit, and
wherein the main unit includes a print function, and each of the subunits is at least one of a power unit that functions as a power source, a consumable unit that supplies a consumable, and a tank unit that holds a consumable.

* * * * *